(12) United States Patent
Hayashi

(10) Patent No.: US 6,367,824 B1
(45) Date of Patent: Apr. 9, 2002

(54) TRICYCLE

(75) Inventor: Masayasu Hayashi, Fujisawa (JP)

(73) Assignees: Avantec Corporation, Chiba; K Design Co., Ltd., Kanagawa; Dox Corporation, Tokyo, all of (JP)

( * ) Notice: Subject to any disclaimer, the term of this patent is extended or adjusted under 35 U.S.C. 154(b) by 0 days.

(21) Appl. No.: 09/508,501

(22) PCT Filed: May 28, 1998

(86) PCT No.: PCT/JP98/02354
§ 371 Date: Mar. 21, 2000
§ 102(e) Date: Mar. 21, 2000

(87) PCT Pub. No.: WO99/61304
PCT Pub. Date: Dec. 2, 1999

(51) Int. Cl.[7] .............................................. B62D 61/06
(52) U.S. Cl. ........................ 280/62; 280/259; 280/267; 280/124.103
(58) Field of Search ................................ 180/210, 217; 280/62, 267, 442, 124.103, 124.116, 124.13, 124.136, 22.1, 124.127, 259, 282

(56) References Cited

U.S. PATENT DOCUMENTS

| | | | |
|---|---|---|---|
| 3,309,097 A | * | 3/1967 | Seeber |
| 3,610,358 A | * | 10/1971 | Korff .......................... 180/25 R |
| 4,003,443 A | * | 1/1977 | Boughers ...................... 180/270 |
| 4,375,293 A | * | 3/1983 | Solbes .......................... 280/22.1 |
| 4,546,997 A | * | 10/1985 | Smyers .......................... 280/772 |
| 4,600,216 A | * | 7/1986 | Burkholder .................. 280/772 |
| 4,624,469 A | * | 11/1986 | Bourne .................... 280/112 A |

FOREIGN PATENT DOCUMENTS

| | | | |
|---|---|---|---|
| JP | 56-82681 | | 7/1981 |
| JP | 401016467 A | * | 1/1989 |
| JP | 1-168585 | | 7/1989 |
| JP | 401168508 A | * | 7/1989 |
| JP | 1-229787 | | 9/1989 |
| JP | 6-171569 | | 6/1994 |
| JP | 6-329068 | | 11/1994 |

* cited by examiner

*Primary Examiner*—J. J. Swann
*Assistant Examiner*—David Divine
(74) *Attorney, Agent, or Firm*—Arent Fox Kintner Plotkin & Kahn, PLLC

(57) ABSTRACT

A tricycle includes left and right front wheel support members which rotatably support left and right front wheels, respectively, and which are disposed on laterally opposite sides of a handle post and pivotally supported on left and right leg members which are supported by the handle post, a steering shaft which is connected to the front wheel support members to steer the front wheels in response to the turning operation of the steering shaft, and a driven wheel supported at a rear portion of a vehicle body frame structure. In this tricycle, a banking travel is possible, leading to an enhanced steering travelability. The handle post 21 and the left leg member $29_L$ are connected to each other through a pair of left upper and lower links $38_L$, $39_L$ to form a left parallel link arrangement $37_L$, while the handle post 21 and the right leg member $29_R$ are connected to each other through a pair of right upper and lower links $38_R$, $39_R$ to form a right parallel link arrangement $37_R$, $94_R$. The left and right parallel link arrangements $37_L$, $37_R$ are formed laterally symmetrically with each other with respect to the handle post 21.

3 Claims, 20 Drawing Sheets

TRICYCLE

FIELD OF THE INVENTION

The present invention relates to a tricycle including a pair of left and right front steerable wheels supported at a front portion of a vehicle body frame structure, and a single rear drivable wheel supported at a rear portion of the vehicle body frame structure, and particularly, to an improvement in a tricycle which can travel on a banking in an attitude in which the vehicle body frame structure is inclined in leftward and rightward directions along with the left and right front wheels.

The terms "left" and "right" used in this specification mean the left and right in a state in which the vehicle body frame structure is turned forwards in an advancing direction of the tricycle.

PRIOR ART

Tricycles which are travelable on bankings are disclosed in, for example, Japanese Patent Application Laid-open Nos. 6-171569, 56-82681 and 1-229787.

In the tricycles disclosed in Japanese Patent Application Laid-open Nos. 6-171569 and 56-82681, the left and right front wheels are disposed to overhang largely from the turning axis. For this reason, it is extremely difficult to enhance the rigidity of support of the front wheels, while providing a reduction in weight of each portion or component, and if the rigidity of support is insufficient, it particularly results in lack of a stability in the banking travel. If the amount of overhanging of the left and right front wheels from the turning axis is large, an inertia moment of the steering system is increased, thereby making it difficult to carry out a light steering operation.

In the tricycle disclosed in Japanese Patent Application Laid-open No. 1-229787, the left and right front wheels are disposed on the turning axis, but a large number of expensive ball joints are used to support the front wheels in such a disposition. This brings about a reduction in rigidity of support of each of the front wheels, and makes it difficult to reduce the cost.

The present invention has been accomplished with such circumstances in view, and it is an object of the present invention to provide an inexpensive tricycle, wherein the rigidity of support of the left and right front wheels is high enough to enable banking travel, even if expensive ball joints are not used, and moreover, the steering operation can be conducted lightly.

DISCLOSURE OF THE INVENTION

To achieve the above object, according to a first aspect and feature of the present invention, there is provided a tricycle including a pair of left and right front steerable wheels supported at a front portion of a vehicle body frame structure, and a single rear drivable wheel supported at a rear portion of the vehicle body frame structure, wherein the tricycle comprises a cylindrical handle post which is fixedly mounted at a front end of the vehicle body frame structure and which turnably supports a steering shaft connected to a steering handlebar, left and right upper links which are integrally connected to each other and pivotally supported at an upper end of the handle post, left and right lower links which are integrally connected to each other and pivotally supported at a lower end of the handle post, a cylindrical left leg member which is pivotally supported at upper and lower opposite ends thereof to outer ends of the left upper and lower links, a cylindrical right leg member which is pivotally supported at upper and lower opposite ends thereof to outer ends of the right upper and lower links, a left front wheel support member rotatably supported on the left leg member, a right front wheel support member rotatably supported on the right leg member, the left front wheel being supported on the left front wheel support member and disposed immediately below the left leg member, the right front wheel being supported on the right front wheel support member and disposed immediately below the right leg member, and a steering operatively-connecting means being disposed below the handle post and both the leg members for operatively connecting the steering shaft and the left and right front wheel support members to each other.

According to a second aspect and feature of the present invention, there is provided a tricycle including a pair of left and right front steerable wheels supported at a front portion of a vehicle body frame structure, and a single rear drivable wheel supported at a rear portion of the vehicle body frame structure, wherein the tricycle comprises a cylindrical handle post which is fixedly mounted at a front end of the vehicle body frame structure and which turnably supports a steering shaft connected to a steering handlebar, left and right upper links which are independent from each other and pivotally supported at an upper end of the handle post, left and right lower links which are independent from each other and pivotally supported at a lower end of the handle post, a cylindrical left leg member which is pivotally supported at upper and lower opposite ends thereof to outer ends of the left upper and lower links, a cylindrical right leg member which is pivotally supported at upper and lower opposite ends thereof to outer ends of the right upper and lower links, a left front wheel support member turnably supported on the left leg member, a right front wheel support member turnably supported on the right leg member, left and right connecting frames which are fixedly mounted on at least ones of: the left and right upper links; and the left and right lower links, respectively, a connecting member which is turnably connected at opposite ends thereof to the connecting frames, the left front wheel being supported on the left front wheel support member and disposed immediately below the left leg member, the right front wheel being supported on the right front wheel support member and disposed immediately below the right leg member, and a steering operatively-connecting means being disposed below the handle post and both the leg members for operatively connecting the steering shaft and the left and right front wheel support members to each other.

The steering operatively-connecting means in each of the first and second features corresponds to a pit-man arm 31, a knuckle arm 32, a tie rod 33 and a ball joint 34 in embodiments of the present invention which will be described later.

With the first and second features, the left and right cylindrical leg members are pivotally supported at upper and lower opposite ends thereof by the left and right upper and lower links, and the left and right front wheels disposed immediately below the left and right leg members are supported by the left and right front wheel support members which are rotatably supported on the left and right leg members. Therefore, the left and right front wheels do not overhang sideways of the left and right leg members and hence, the rigidity of support of the left and right front wheels can be enhanced effectively in cooperation with the firm supporting of the upper and lower opposite ends of the leg members. As a result, it is possible to provide an enhancement in stability of the banking travel.

In addition, because the left and right front wheels do not overhang sideways of the left and right leg members, a reduction in inertia moment of the steering system is brought about, whereby the steering operation can be conducted lightly.

Further, since the steering operatively-connecting means for operatively connecting the steering shaft and the left and right front wheel support members to each other is disposed below the handle post and the left and right leg members, a wide space, which is free from interference of the steering operatively-connecting means, can be ensured in front of and above the handle post and the left and right leg members and hence, it is easy to place a carrier and the like.

Moreover, no ball joint is used in order to support the left and right front wheels, as described above, and hence, it is easy to ensure the rigidity of support of the front wheels, and it is possible to provide a reduction in cost.

According to a third aspect and feature of the present invention, in addition to the first or second feature, a left upright attitude maintaining means is provided between the handle post and one of the left upper and right links for exhibiting a spring force for returning the handle post to upright attitude thereof in response to the handle post inclining leftwards from the upright attitude, but for avoiding exhibiting a spring force, when the handle post is inclined rightwards from the upright attitude, and a right upright attitude maintaining means is provided between the handle post and one of the right upper and lower links for exhibiting a spring force for returning the handle post to upright attitude thereof in response to the handle post inclining rightwards from the upright attitude, but for avoiding exhibiting a spring force, when the handle post is inclined leftwards from the upright attitude, and a spring force for biasing the handle post in a direction toward the upright attitude being applied to the left and right upright attitude maintaining means even in the upright state of the handle post.

With the third feature, when the vehicle body frame structure has been inclined leftwards, a spring force for returning the vehicle body frame structure toward the upright attitude is applied to the vehicle body frame structure by the left upright attitude maintaining means. When the vehicle body frame structure has been inclined rightwards, a spring force for returning the vehicle body frame structure toward the upright attitude is applied to the vehicle body frame structure by the right upright attitude maintaining means. When the tricycle is at a stop in a non-ridden state, a driver can ride on the tricycle without anxiety in the upright attitude of the vehicle body frame structure. When the tricycle has been switched over from a turning traveling state with the vehicle body frame structure inclined, to a straight traveling state, the vehicle body frame structure is restored to the upright attitude, whereby the steerability can be further enhanced.

BEST MODE FOR CARRYING OUT THE INVENTION

A mode for carrying out the present invention will now be described by way of embodiments shown in the accompanying drawings.

FIGS. 1 to 10 show a first embodiment of the present invention.

Figure 1:
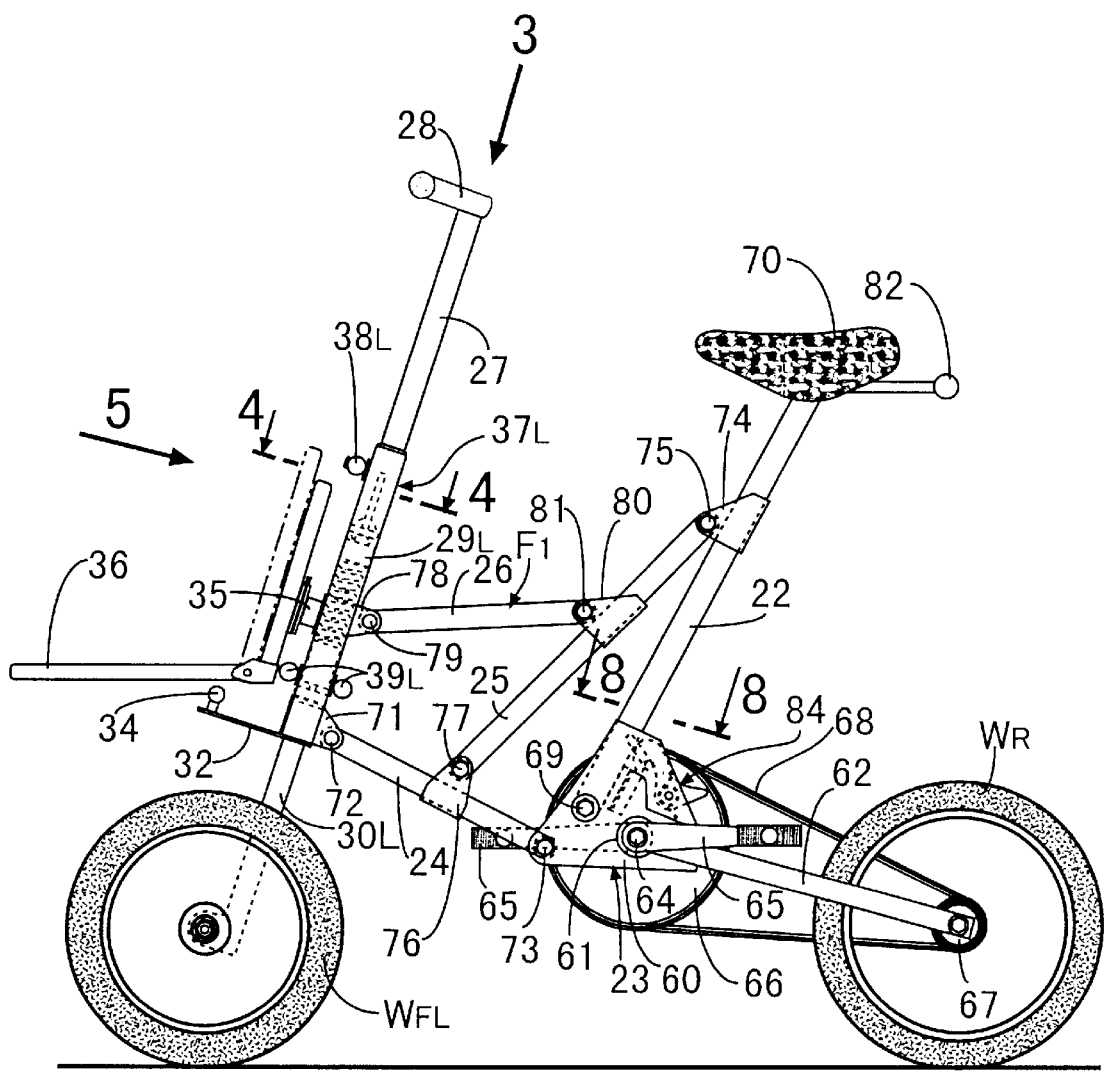
FIG. 1 is a side view of a tricycle used also as a cart, which is in a bicycle mode according to a first embodiment.
Figure 2:
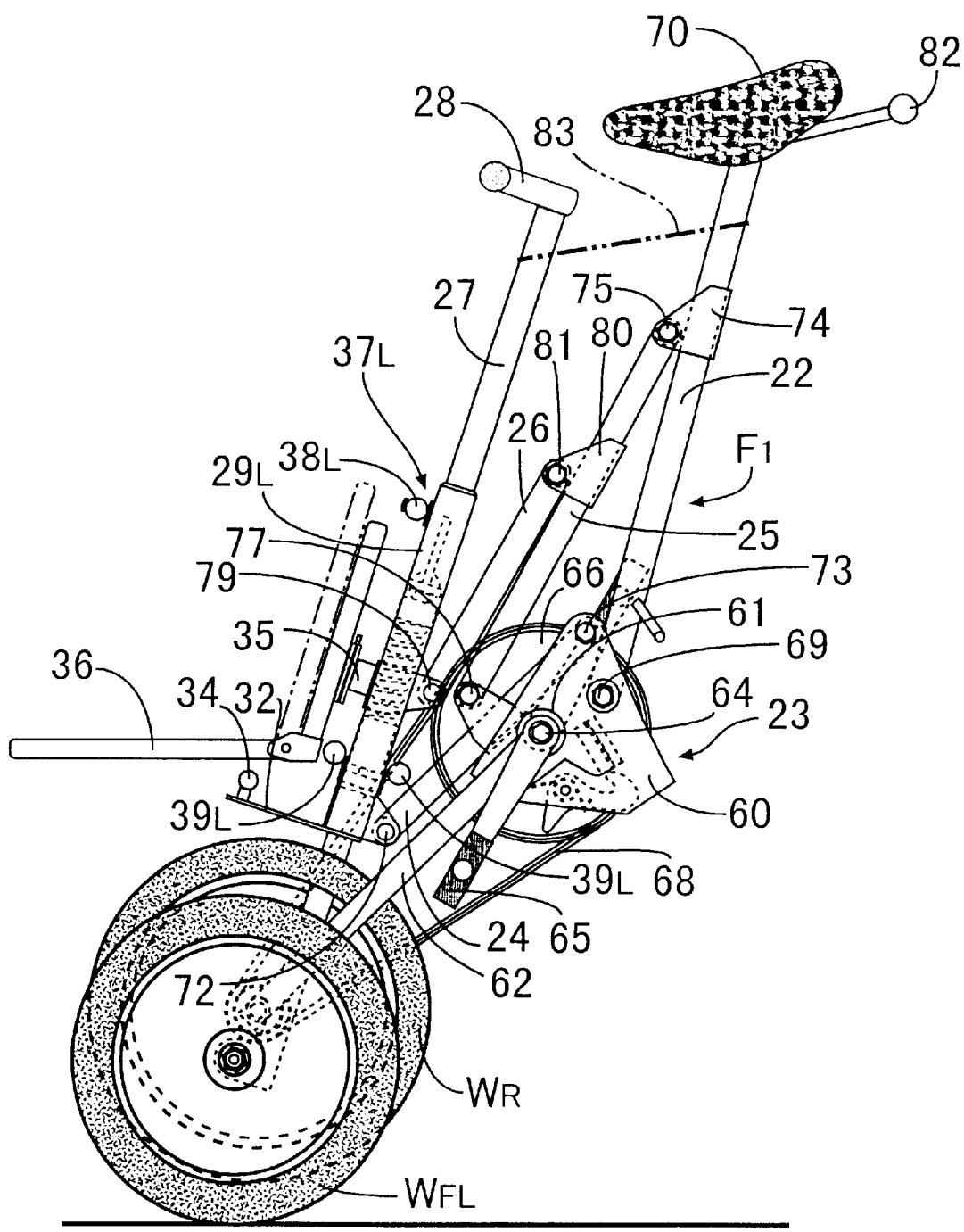
FIG. 2 is a side view of a tricycle used also as a cart, which is in a cart mode.
Figure 3:
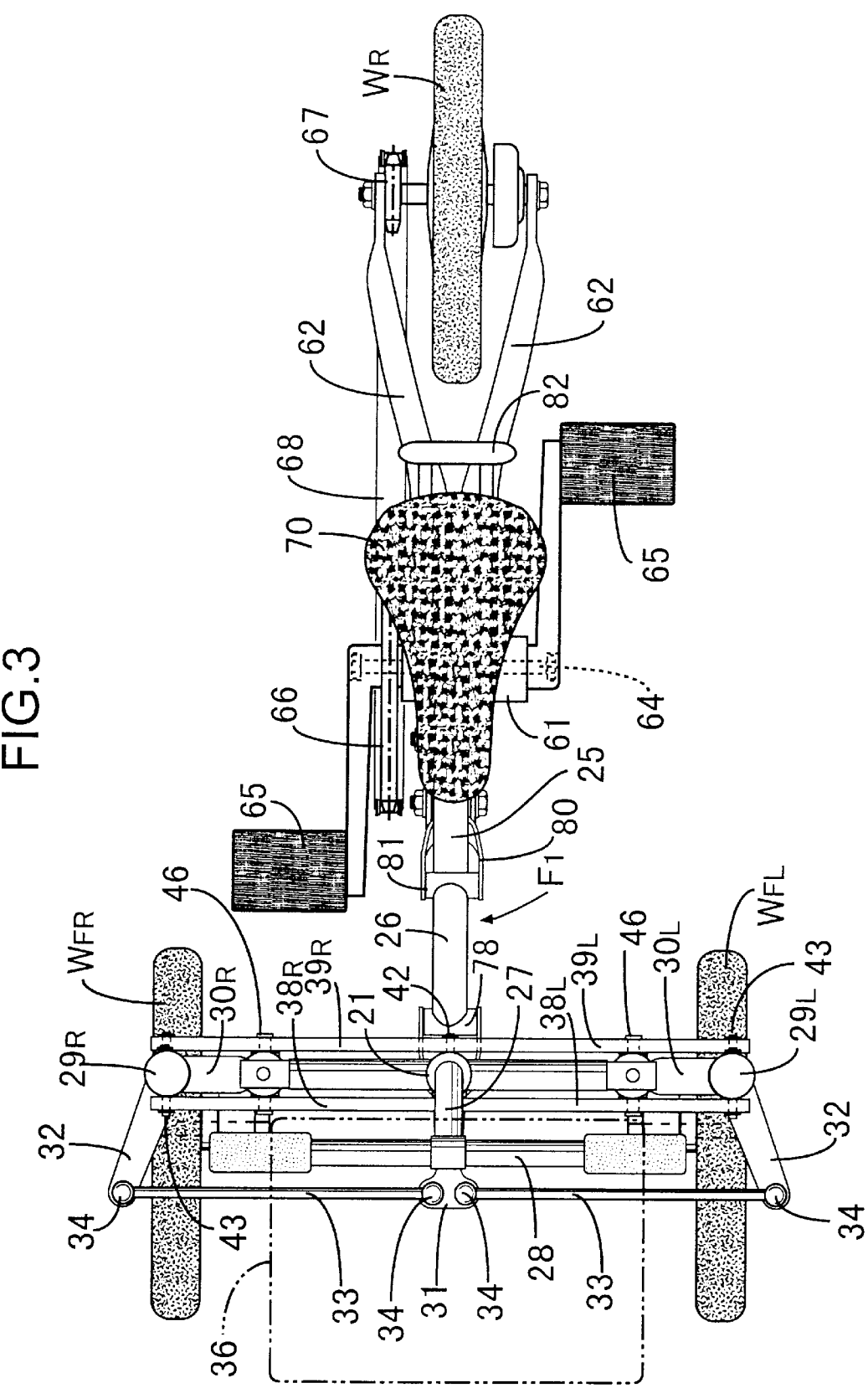
FIG. 3 is an enlarged plan view taken in the direction of an arrow 3 in FIG. 1.
Figure 4:
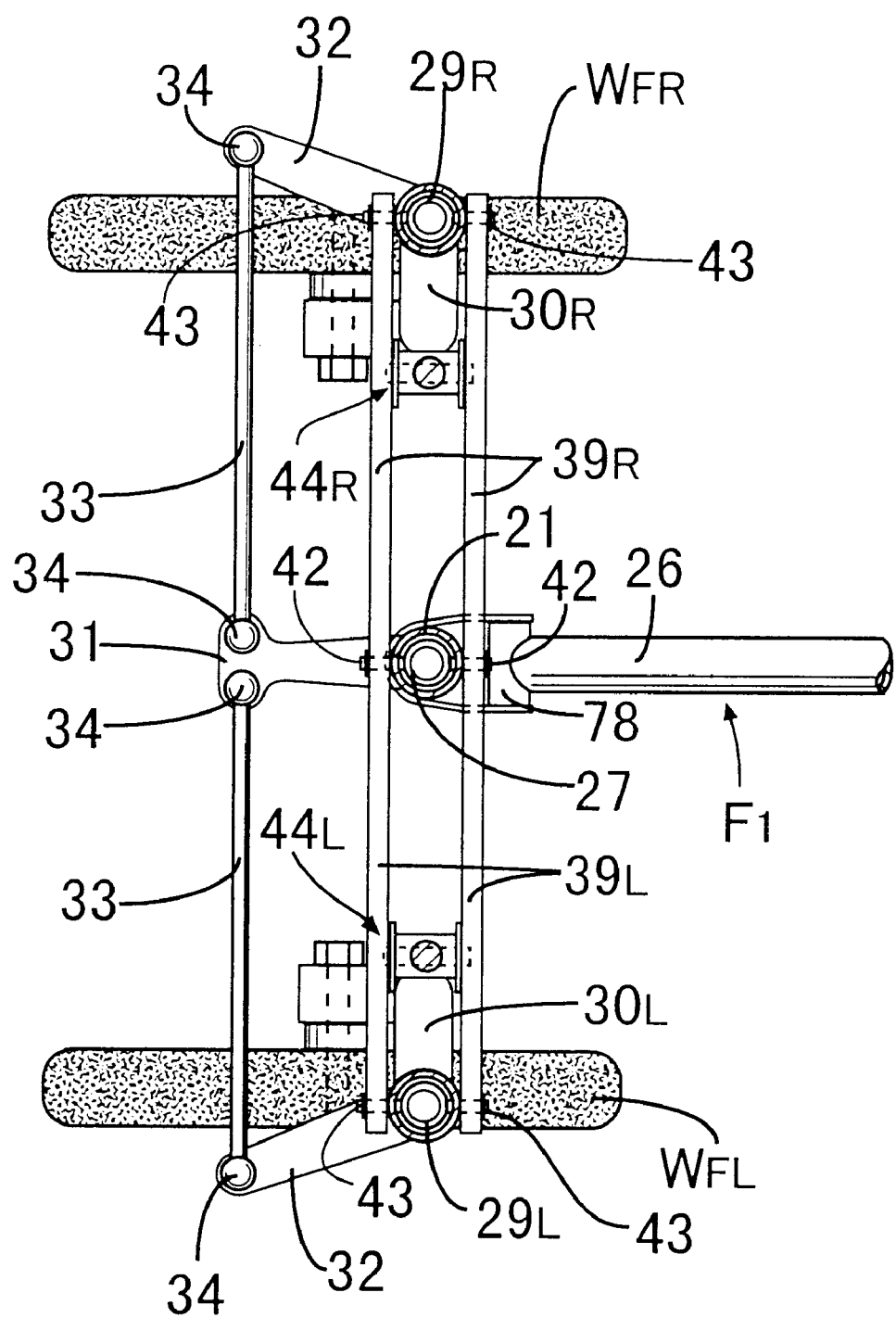
FIG. 4 is an enlarged sectional view taken along a line 4—4 in FIG. 1.
Figure 5:
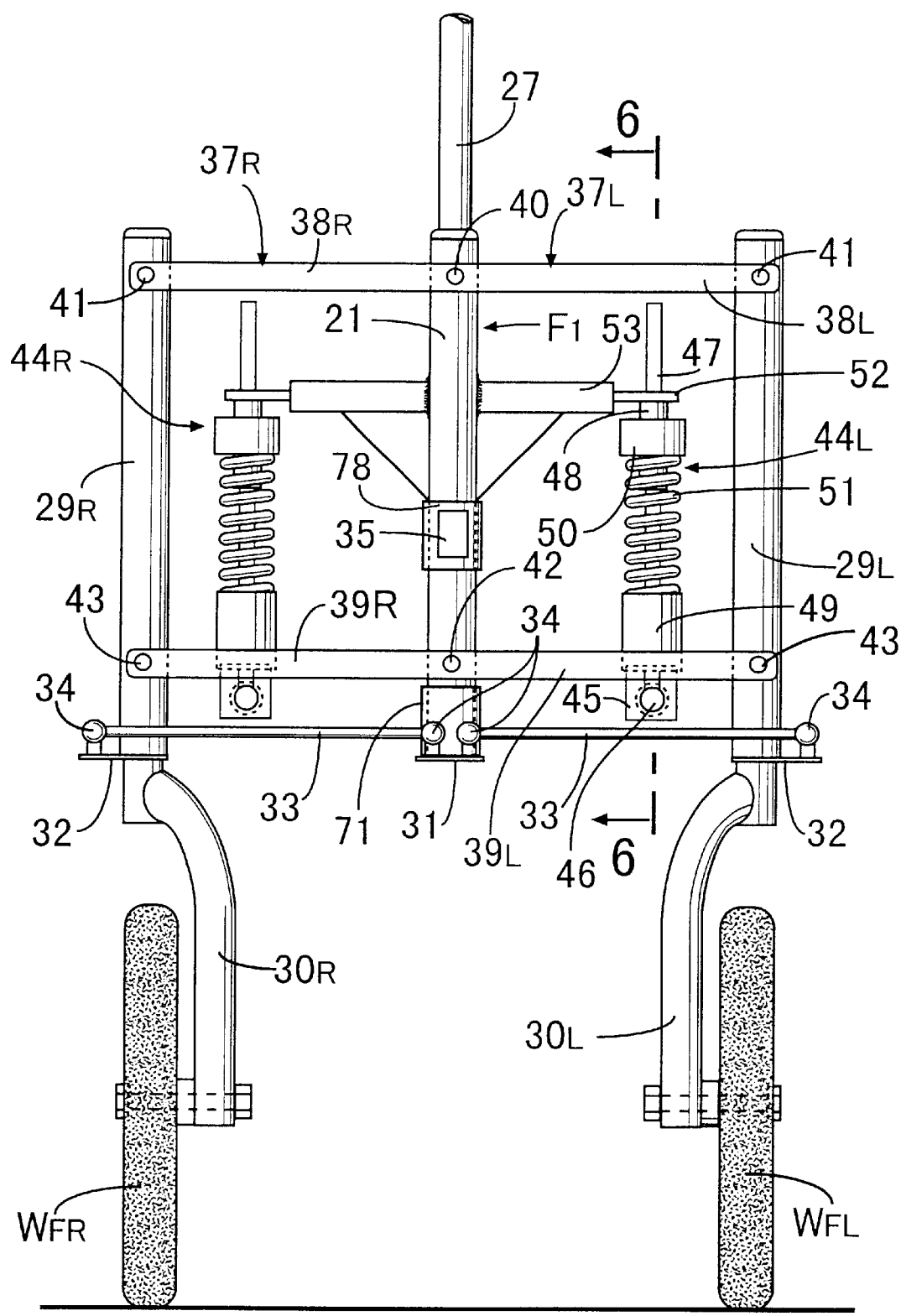
FIG. 5 is an enlarged front view taken in the direction of an arrow 5 in FIG. 1 with a carrier omitted.

Referring first to FIGS. 1 to 5, a vehicle body frame structure $F_1$ of a tricycle that can be used also as a cart is comprised of a handle post 21, a saddle post 22, a rear frame 23, a bottom pipe 24, a first link pipe 25 and a second link pipe 26. The vehicle body frame structure $F_1$ is capable of being switched over between a bicycle mode in which it has been deployed, as shown in FIG. 1, and a cart mode in which it has been folded up, as shown in FIG. 2.

A steering shaft 27 is turnably carried in the handle post 21 extending upwards and downwards and fitted in the handle post 21, and a steering handle bar 28 is fixedly mounted at an upper end of the steering shaft 27.

Left and right cylindrical leg members $29_L$ and $29_R$ are disposed on left and right opposite sides of the handle post 21 to extend upwards and downwards in parallel to the handle post 21. A left front wheel supporting member $30_L$ supporting a left front wheel $W_{FL}$ for rotating movement is rotatably carried on the left leg member $29_L$, and a right front wheel supporting member $30_R$ supporting a right front wheel $W_{FR}$ for rotating movement is rotatably carried on the right leg member $29_R$. In this case, the left front wheel $W_{FL}$ is disposed immediately below the left leg member $29_L$, and the right front wheel $W_{FR}$ is disposed immediately below the right leg member $29_R$.

A pit-man arm 31 is secured to a lower end of the steering shaft 27 below a lower end of the handle post 21, and knuckle arms 32, 32 are secured to the left and right front wheel supporting members $30_L$ and $30_R$ below lower ends of the left and right leg members $29_L$ and $29_R$, respectively. Opposite ends of tie rods 33, 33 are connected to the pit-man arm 31 and the knuckle arms 32, 32 through ball joints 34, 34.

Thus, the pit-man arm 31 is turned leftwards and rightwards through the steering shaft 27 in response to the turning of the steering handle bar 28 in left and right directions, and in response to this, the left and right knuckle arms 32, 32 are turned leftwards and rightwards through the tie rods 33, 33, whereby the left front wheel $W_{FL}$ and the right front wheel $W_{FR}$ are turned leftwards and rightwards.

A mounting stay 35 is secured to an intermediate portion of the handle post 21 to protrude forwards, and a carrier 36 is attached to the mounting stay 35. It is desirable that the carrier 36 is formed so that it can be switched over between a service state in which it has protruded forwards (a state shown by a solid line in FIG. 1) and in a non-service state in which it has been folded up rearwards (a state shown by a dashed line in FIG. 1).

The handle post 21 and the left leg member $29_L$ are connected to each other through a left upper link $38_L$ and left lower links $39_L$ and $39_L$ to form a left parallel link arrangement $37_L$, and the handle post 21 and the right leg member $29_R$ are connected to each other through a right upper link $38_R$ and right lower links $39_R$ and $39_R$ to form a right parallel link arrangement $37_R$. The left and right parallel link arrangements $37_L$ and $37_R$ are formed laterally symmetrically with respect to the handle post 21.

The left and right upper links $38_L$ and $38_R$ are each formed integrally with each other into a pipe-shape and disposed in front of the handle post 21 and the leg members $29_L$ and $29_R$. The upper links $38_L$ and $38_R$ are turnably connected at their connections to the handle post 21 through a connecting pin 40 having an axis extending longitudinally. In addition, the left and right upper links $38_L$ and $38_R$ are turnably connected at their outer ends to upper portions of the leg members $29_L$ and $29_R$ through connecting pins 41, 41 having axes parallel to the connecting pin 40.

The left and right lower links $39_L$, $39_R$; $39_L$, $39_R$ are also each formed integrally with each other into a pipe-shape and disposed at locations in which they sandwich the handle post 21 and the leg members $29_L$ and $29_R$ from the front and the rear. The left and right lower links $39_L$, $39_R$; $39_L$, $39_R$ are turnably connected at their connections to the handle post 21 through connecting pins 42, 42 having axes parallel to the connecting pin 40, and are also turnably connected at their outer ends to lower portions of the leg members $29_L$ and $29_R$ through connecting pins 43, 43 having axes parallel to the connecting pins 42, 42, respectively.

In the left parallel link arrangement $37_L$, a left upright attitude maintaining means $44_L$ is provided between the handle post 21 and one of the left upper and lower links $38_L$ and $39_L$, $39_L$, e.g., the left lower links $39_L$, $39_L$. In the right parallel link arrangement $37_R$, a right upright attitude maintaining means $44_R$ is provided between the handle post 21 and one of the right upper and lower links $38_R$ and $39_R$, $39_R$, e.g., the right lower links $39_R$, $39_R$.

Figure 6:
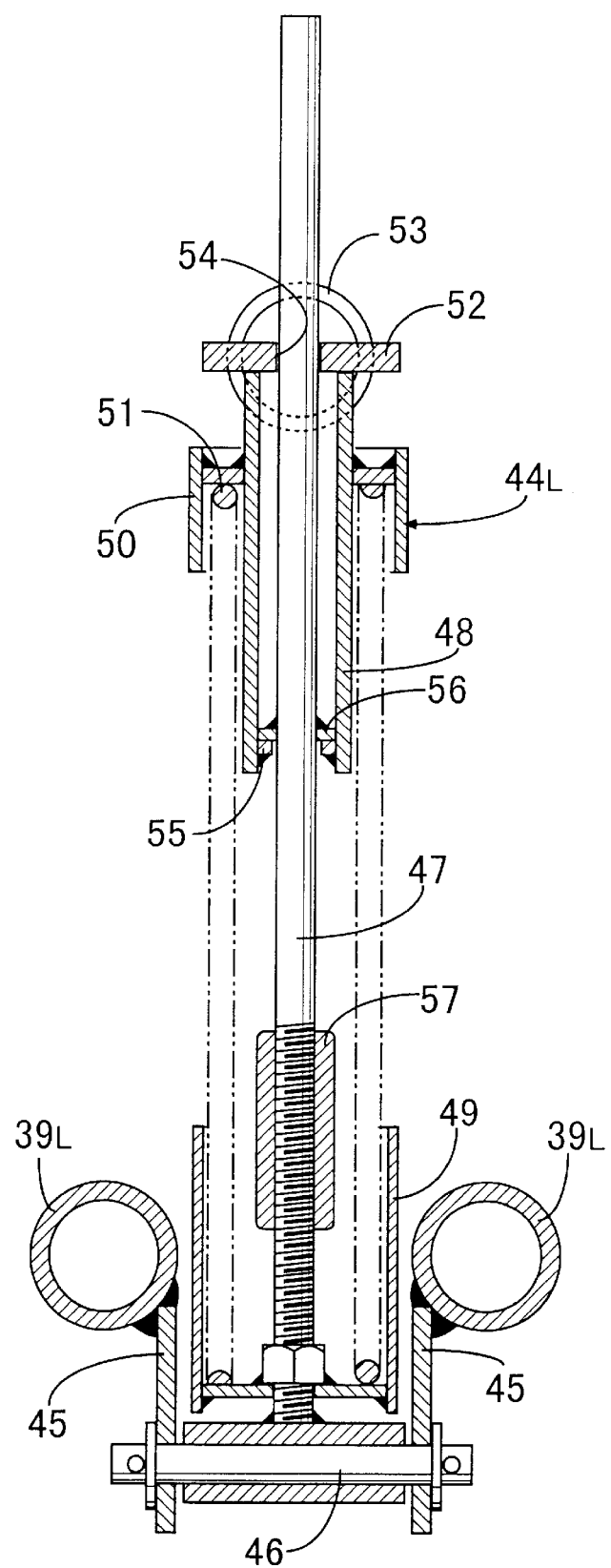
FIG. 6 is an enlarged sectional view taken along a line 6—6 in FIG. 5.

Referring to FIG. 6, the left upright attitude maintaining means $44_L$ includes a support shaft 46 mounted between bracket plates 45, 45 secured respectively to the left lower links $39_L$ and $39_L$ and having an axis parallel to the connecting pins 40 to 43 of the left parallel link arrangement $37_L$, a guide rod 47 extending upwards and downwards and turnably carried at its lower end on the support shaft 46, a movable tube 48 coaxially surrounding the guide rod 47, a stationary retainer 49 disposed between the left lower links $39_L$, $39_L$ and secured to a lower portion of the guide rod 47, a movable retainer 50 secured to the movable tube 48, a coil spring 51 mounted under compression between the stationary retainer 49 and the movable retainer 50 to surround the guide rod 47, and an abutment plate 52 fixed to the handle post 21, so that it can be put into abutment against an upper end of the movable tube 48.

A support tube 53 is secured to the handle post 21 in an intermediate portion between the upper and lower links $38_L$ and $39_L$, $39_L$ of the left parallel link arrangement $37_L$ and extends toward the left leg member $29_L$, and the abutment plate 52 is secured to a tip end of the support tube 53. The abutment plate 52 is provided with a guide bore 54 through which the guide rod 47 is movably inserted, with an upper end of the guide rod 47 being passed through the abutment plate 52 to protrude upwards.

An inward-facing collar 55 protruding radially inwards is secured to an inner surface of a lower end of the movable tube 48 to surround the guide rod 47. A limiting collar 56 protruding radially outwards is secured to the guide rod 47 with its outer periphery brought into sliding contact with the inner surface of the movable tube 48, so that it can be put into abutment against an upper surface of the inward-facing collar 55. Moreover, a limiting collar 56 is secured to the guide rod 47 in such a manner that the inward-facing collar 55 of the movable tube 48 biased upwards by the coil spring 51 is put against the limiting collar 56 in a state in which the handle post 21 assumes an upright attitude. In this case, the axial length of the movable tube 48 as well as the position of securing of the inward-facing collar 55 to the movable tube 48 are determined, so that the upper end of the movable tube 48 is in abutment against the lower surface of the abutment plate 52, or is at a location extremely close to the lower surface of the abutment plate 52.

A nut 57 is threadedly fitted over the lower portion of the guide rod 47, so that its advanced and retreated positions can be regulated. An end of downward movement of the movable tube 48 is defined by abutment of the inward-facing collar 55 against the nut 57.

Figure 7:
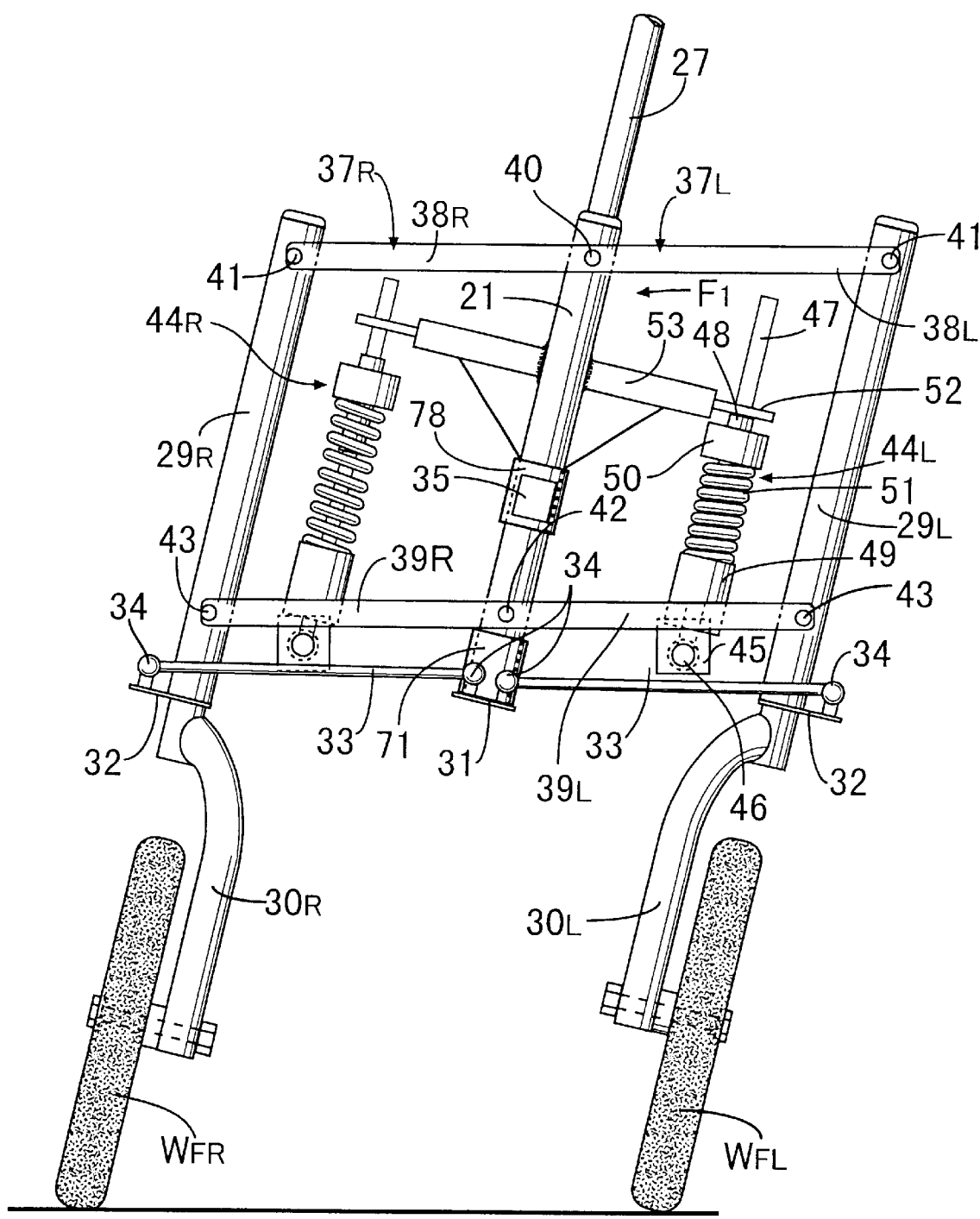
FIG. 7 is a front view similar to FIG. 5, but with a vehicle body frame structure inclined leftwards.

The leg members $29_L$ and $29_R$ are also inclined leftwards in response to the leftward inclination of the handle post 21, as shown in FIG. 7, because the left and right parallel link arrangements $37_L$ and $37_R$ are formed between the handle post 21 and the left and right leg members $29_L$ and $29_R$. In this case, in the left upright attitude maintaining means $44_L$, the movable tube 48 is pushed downwards by the abutment plate 52, while compressing the coil spring 51, and a spring force of returning the handle post 21 to its upright attitude is applied to the abutment plate 52, i.e., to the handle post 21. On the other hand, when the handle post 21 is tilted rightwards from the upright attitude, an upper limit position of the movable tube 48 is defined by abutment of the inward-facing collar 55 against the limiting collar 56. Therefore, the abutment plate 52 is moved away from the upper end of the movable tube 48 and inclined rightwards and hence, a spring force cannot be applied from the left upright attitude maintaining means $44_L$ to the handle post 21.

The right upright attitude maintaining means $44_R$ basically has the same structure as the left upright attitude maintaining means $44_L$, and the detailed description thereof is omitted. The right upright attitude maintaining means $44_R$ exhibits a spring force for returning the handle post 21 to the upright attitude in response to the rightward tilting movement of the handle post 21 from the upright attitude, but when the handle post 21 is tilted leftwards from the upright attitude, the spring force cannot be applied from the right upright attitude maintaining means $44_R$ to the handle post 21.

Figure 8:
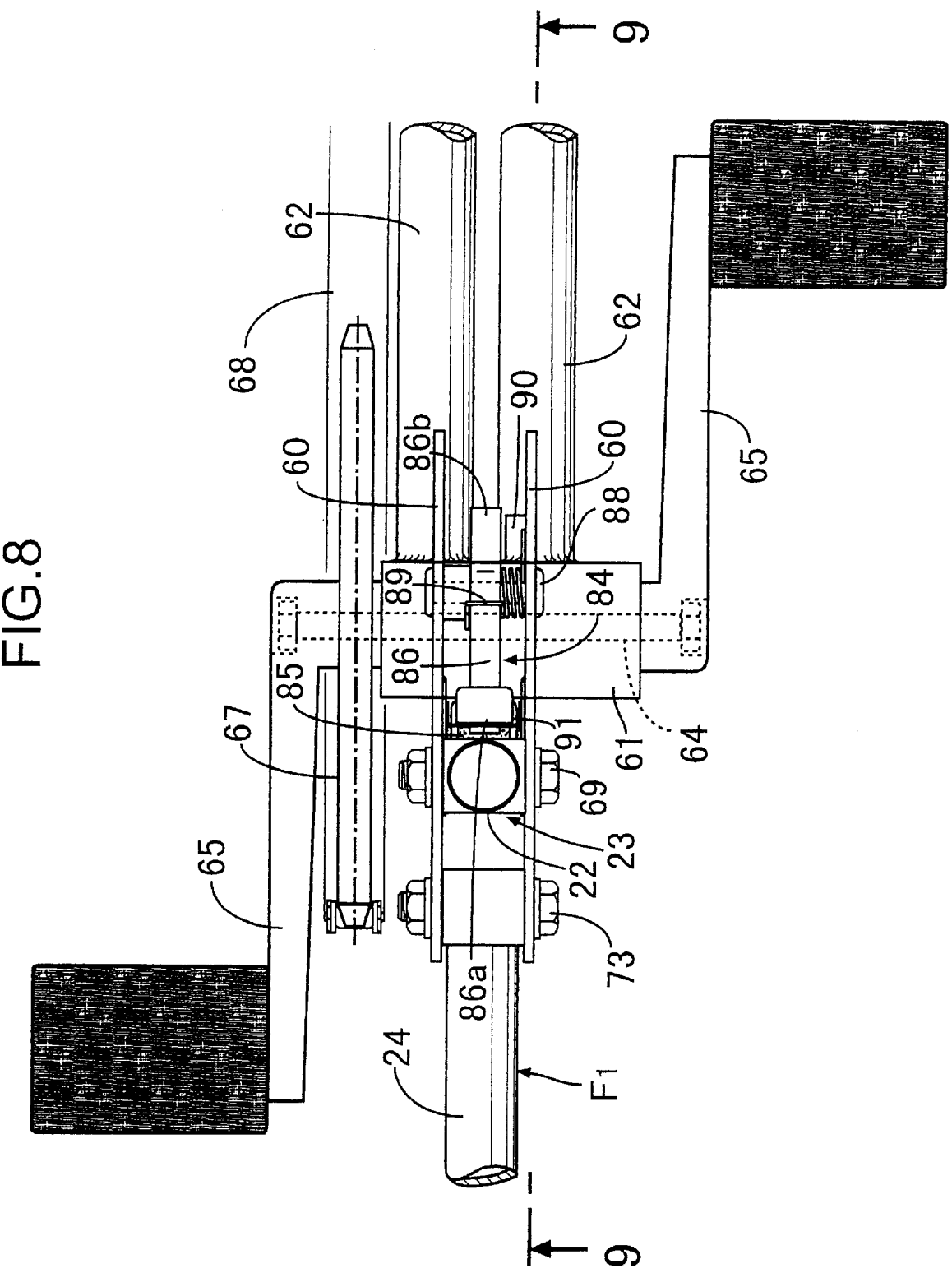
FIG. 8 is an enlarged sectional view taken along a line 8—8 in FIG. 1.
Figure 9:
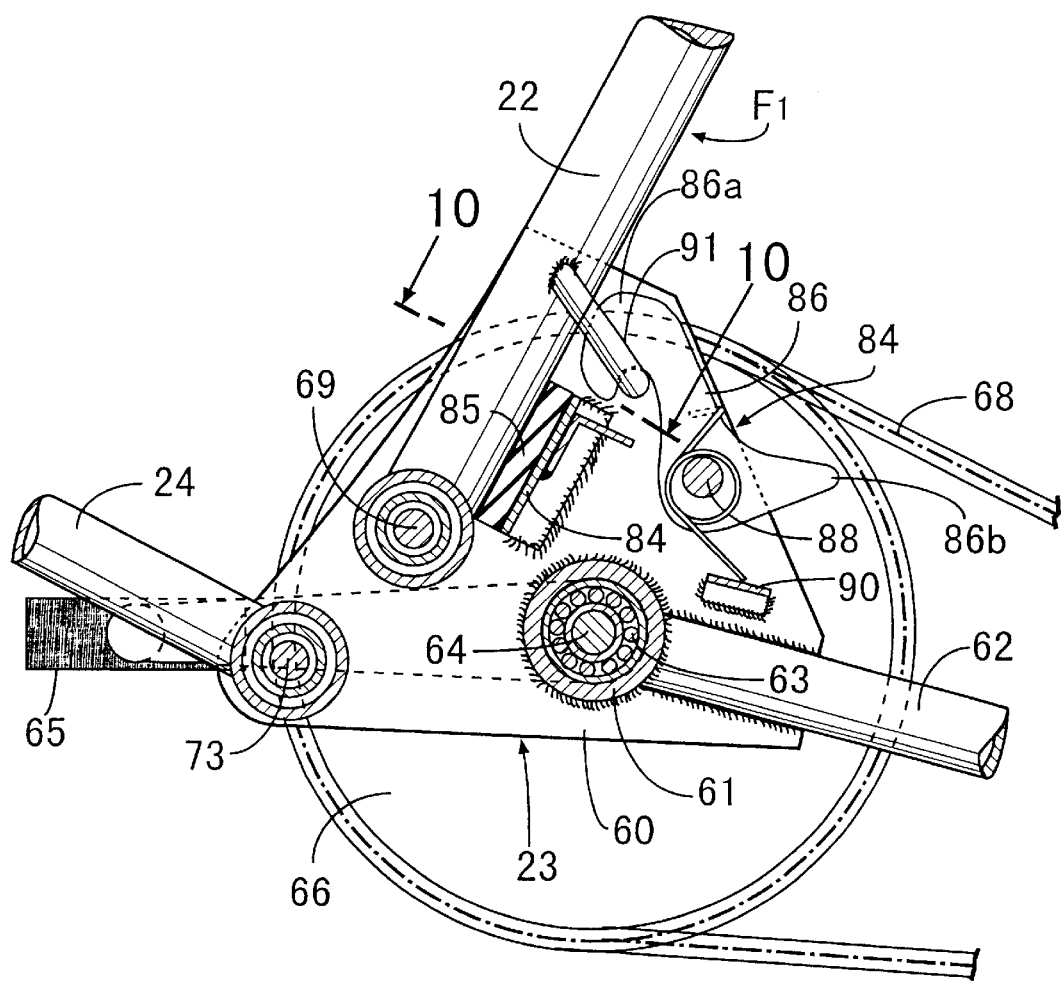
FIG. 9 is a sectional view taken along a line 9—9 in FIG. 8.

Referring also to FIGS. 8 and 9, the rear frame 23 comprises a pair of frame plates 60, 60 parallel to each other, a tube 61 which has an axis parallel to rotational axes of the left and right front wheels $W_{FL}$ and $W_{FR}$ and which has opposite outer ends protruding outwards from the frame plates 60, 60 and connects the frame plates 60, 60 to each other, and a pair of left and right pipe-shaped rear forks 62, 62 secured to the frame plates 60, 60 and the tube 61. When the vehicle body frame structure $F_1$ is in the bicycle mode, as shown in FIG. 1, the rear forks 62, 62 are inclined rearwards and downwards from the frame plates 60, 60 and the tube 61 to extend rearwards, and the rear wheel $W_R$, which is a driven wheel, is pivotally supported at rear ends of the rear forks 62, 62.

A crankshaft 64 is rotatably carried in the tube 61 through a ball bearing 63, and crank pedals 65, 65 are fixed to opposite ends of the crankshaft 64. Moreover, a driving sprocket 66 is fixed to the crankshaft 64 on the right of the tube 61, and an endless chain 68 is reeved around a follower sprocket 67 fixed to the rear wheel $W_R$ and around the driving sprocket 66. Therefore, the rear wheel $W_R$ is rotated by the depression of the crank pedals 65, 65.

The saddle post 22 extends upwards from the rear frame 23 and is turnably connected at its lower end to the rear frame 23 through a pivot (a bolt in this embodiment) 69 which is mounted between both the frame plates 60, 60 and has an axis parallel to the crankshaft 64. A saddle 70 is mounted at an upper end of the saddle post 22.

The bottom pipe 24 connects the lower portion of the handle post 21 and the rear frame 23 to each other. The bottom pipe 24 is turnably connected at its one end to a bracket 71 mounted at the lower portion of the handle post 21 through a pivot 72 having an axis parallel to the pivot 69, and is turnably connected at the other end to the rear frame 23 through a pivot (a bolt in this embodiment) 73 which is mounted between both the frame plates 60, 60 and has an axis parallel to the pivot 72.

The first link pipe 25 connects an intermediate portion in the upward and downward direction of the saddle post 22 and a lengthwise intermediate portion of the bottom pipe 24 to each other. The first link pipe 25 is connected at its one end to a bracket 74 secured the intermediate portion in the upward and downward direction of the saddle post 22 through a pivot (a bolt in this embodiment) 75 having an axis parallel to the pivots 69, 72 and 73, and is connected at the other end to a bracket 76 secured to the lengthwise intermediate portion of the bottom pipe 24 through a pivot (a bolt in this embodiment) 77 having an axis parallel to the pivot 75.

The second link pipe 26 connects an intermediate portion in the upward and downward direction of the handle post 21 and a lengthwise intermediate portion of the first link pipe 25 to each other. The second link pipe 26 is connected at its one end to a bracket 78 secured to the intermediate portion in the upward and downward direction of the handle post 21 through a pivot 79 having an axis parallel to the pivots 69, 72, 73, 75 and 77, and is connected at the other end to a bracket 80 secured to the lengthwise intermediate portion of the first link pipe 25 through a pivot (a bolt in this embodiment) 81 having an axis parallel to the pivot 79.

The handle post 21, the saddle post 22, the rear frame 23, the bottom pipe 24, the first link pipe 25 and the second link pipe 26, which are turnably connected to one another through the pivots 69, 72, 73, 75, 77, 79 and 81 and form the vehicle body frame structure $F_1$ in the above manner, comprise a link mechanism which is capable of switching over, from one to another, a bicycle mode In which the vehicle body frame structure $F_1$ has been deployed, so that both the left and right front wheels $W_{FL}$ and $W_{FR}$ and the rear wheel $W_R$ are grounded to provide a maximum wheel base, as shown in FIG. 1, and a cart mode in which the vehicle body frame structure $F_1$ has been folded up, so that the rear wheel $W_R$ spaced apart from the ground surface is inserted between the left and right front wheels $W_{FL}$ and $W_{FR}$ which are in their grounded states, as shown in FIG. 2.

To facilitate the operation of switching over the bicycle mode and the cart mode from one to the other, a grip 82 is provided at the upper end of the saddle post 22 to protrude rearwards of the saddle 70.

When the vehicle body frame structure $F_1$ is in the cart mode, the cart mode can be maintained, if the steering shaft 27 and the saddle post 22 are fastened by a fastening means 83 such as a rubber band and a string member, as shown by a dashed line in FIG. 2. When the vehicle body frame structure $F_1$ is in the bicycle mode, the bicycle mode of the vehicle body frame structure $F_1$ can be maintained by a lock means 84.

The lock means 84 is provided between the saddle post 22 and the rear frame 23 among the handle post 21, the saddle post 22, the rear frame 23, the bottom pipe 24, the first link pipe 25 and the second link pipe 26 which form the vehicle body frame structure $F_1$.

The lock means 84 includes a resilient member 85 which is made of an elastic material such as a rubber and which is fixed to the rear frame 23 and sandwiched between the saddle post 22 and the rear frame 23 in such a manner to exhibit a resilient force opposing a riding load applied from the saddle post 22 when the vehicle body frame structure $F_1$ is in the bicycle mode, and an engage member 86 which is mounted to the rear frame 23 to releasably engage the saddle post 22 to maintain the relative positions of the saddle post 22 and the rear frame 23.

Figure 10:
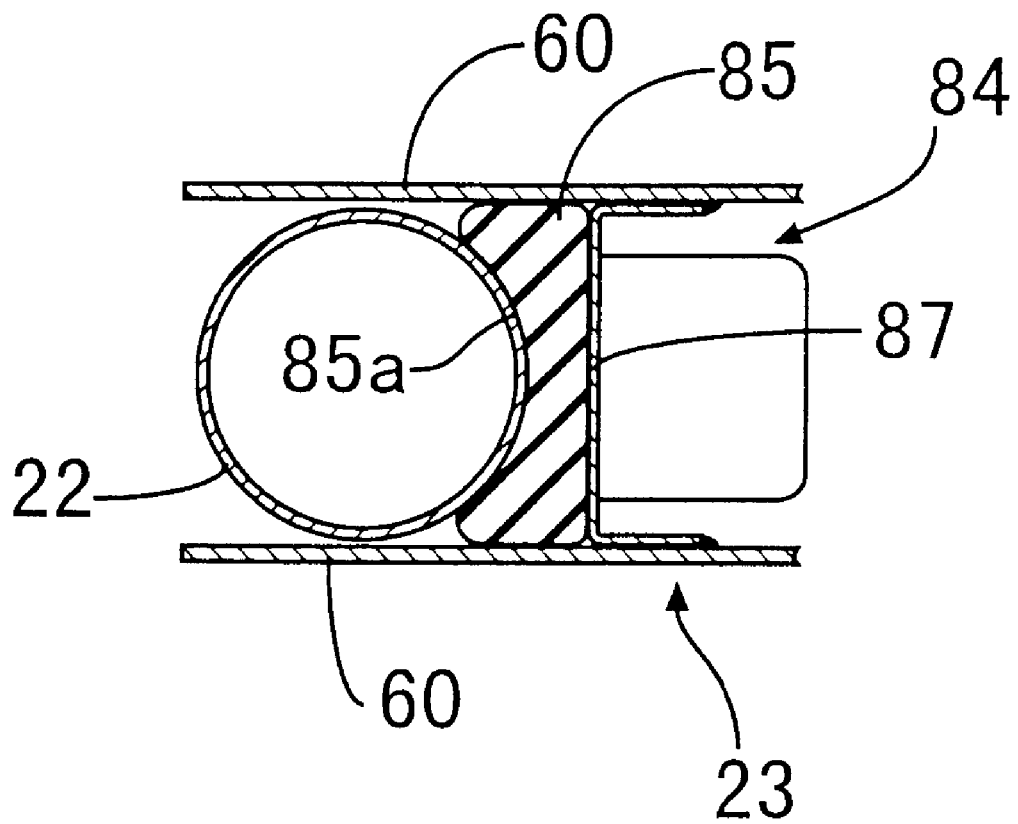
FIG. 10 is a sectional view taken along a line 10—10 in FIG. 9.

Referring also to FIG. 10, a support plate 87 is secured between both the frame plates 60, 60 in the rear frame 23 to oppose the rear surface of the saddle post 22, when the vehicle body frame structure $F_1$ has been brought into the bicycle mode. The resilient member 85 is secured to the support plate 87, so that its abutment surface 85a recessed in an arcuate shape in correspondence to the rear surface of the pipe-shaped saddle post 22 faces toward the saddle post 22. Thus, when the vehicle body frame structure $F_1$ has been brought into the bicycle mode, the resilient member 85 is sandwiched between the support plate 87 secured to the rear frame 23 and the saddle post 22 and exhibits the resilient force opposing the riding load applied from the saddle post 22. Moreover, the resilient force exhibited by the resilient member 85 is applied to the saddle post 22 in a direction to turn the saddle post 22 forwards about the axis of the pivot 69 and also applied to the rear frame 23 in a direction to turn the rear frame 23 rearwards about the axis of the pivot 73. The resilient force exhibited by the resilient member 85 is applied to the saddle post 22 and the rear frame 23 to provide the cart mode.

The engage member 86 is turnably support at its base portion by a shaft 88 which is provided to extend between both the frame plates 60, 60 and has an axis parallel to the crankshaft 64. The engage member 86 has a hook-shaped engage claw 86a provided at its tip end. On the other hand, a substantially U-shaped locking member 91 is secured to the saddle post 22, so that the engage claw 86a can be brought into engagement with the locking member 91. When the vehicle body frame structure $F_1$ is in the bicycle mode, the relative positions of the saddle post 22 and the rear frame 23 are maintained by bringing the engage claw 86a into engagement with the locking member 91, while compressing the resilient member 85.

A torsion spring 89 is mounted between the engage member 86 and a receiving plate 90 secured to an inner surface of one of the frame plates 60, 60 to surround the shaft 88, so that the engage member 86 is biased and turned by a spring force of the torsion spring 89 in a direction to bring the engage claw 86a into engagement with the locking member 91.

Further, an operating portion 86b is integrally provided at the base portion of the engage member 86 to protrude outwards in a radial direction of the shaft 86. Thus, the engage member 86 can be operated in a direction to disengage the engage claw 86a from the locking member 91 by putting an operator's finger onto the operating portion 86b to operate the latter.

The operation of the first embodiment will be described below. If the vehicle body frame structure $F_1$ is deployed into the bicycle mode, as shown in FIG. 1, the tricycle used also as a cart can be used as a bicycle. In this case, when the vehicle body frame structure $F_1$ has been deployed into the bicycle mode, the locking means 84 is provided between the saddle post 22 and the rear frame 23 among the handle post 21, the saddle post 22, the rear frame 23, the bottom pipe 24, the first link pipe 25 and the second link pipe 26 which form the vehicle body frame structure $F_1$, and the relative positions of the saddle post 22 and the rear frame 23 are maintained by the locking means 84, whereby the bicycle mode of the vehicle body frame structure $F_1$ is maintained.

Moreover, the locking means 84 includes the resilient member 85 which is sandwiched between the saddle post 22 and the rear frame 23 and exhibits the resilient force opposing the riding load. Even if the fabricating accuracy and assembling accuracy for the handle post 21, the saddle post 22, the rear frame 23, the bottom pipe 24, the first link pipe 25 and the second link pipe 26 are somewhat poor, it is possible to absorb the fabricating and assembling errors of the handle post 21, the saddle post 22, the rear frame 23, the bottom pipe 24, the first link pipe 25 and the second link pipe 26 by the resilient member 85 to prevent the looseness from occurring among the handle post 21, the saddle post 22, the rear frame 23, the bottom pipe 24, the first link pipe 25 and the second link pipe 26, thereby enhancing the riding comfort. In addition, it is possible to enhance the cushion property by exhibiting the resilient force opposing the riding load by the resilient member 85, thereby further enhancing the riding comfort.

The left and right parallel link arrangements $37_L$ and $37_R$ are formed between the handle post 21 and the left and right leg members $29_L$ and $29_R$ and hence, the leg members $29_L$ and $29_R$ are inclined leftwards and rightwards in response to the leftward and rightward inclination of the handle post 21, whereby the left and right front wheels $W_{FL}$ and $W_{FR}$ can be inclined. Thus, a banking travel of the tricycle is feasible, i.e., the tricycle can be allowed to travel with the vehicle body frame structure $F_1$ inclined leftwards or rightwards, leading to an enhanced steering travelability.

Moreover, the left and right upper links $38_L$ and $38_R$ in the parallel link arrangements $37_L$ $37_R$ are formed integrally with each other, and the left and right lower links $39_L$, $39_L$ and $39_R$, $39_R$ in the parallel link arrangements $37_L$ and $37_R$ are also formed integrally with each other. Therefore, it is possible to reduce the number of parts forming the left and right parallel link arrangements $37_L$ and $37_R$ as much as possible and to reduce the number of assembling steps.

Further, in the left parallel link arrangement $37_L$, the left upright attitude maintaining means $44_L$ is provided between the handle post 21 and the left lower links $39_L$ and $39_L$ for exhibiting the spring force for returning the handle post 21 to the upright attitude in response to the leftward inclination of the handle post 21 from the upright attitude, but for avoiding exhibiting a spring force, when the handle post 21 is inclined rightwards from the upright attitude. In the right parallel link arrangement $37_R$, the right upright attitude maintaining means $44_R$ is provided between the handle post 21 and the right lower links $39_R$ and $39_R$ for exhibiting the spring force for returning the handle post 21 to the upright attitude in response to the rightward inclination of the handle post 21 from the upright attitude, but for avoiding exhibiting a spring force, when the handle post 21 is inclined leftwards from the upright attitude. Therefore, when the vehicle body frame structure $F_1$ has been inclined either leftwards or rightwards, the spring force for returning the handle post 21 to the upright attitude is applied to the vehicle body frame structure $F_1$. Thus, when the tricycle is at stop in a non-ridden state, the vehicle body frame structure $F_1$ can be brought into the upright attitude, whereby a driver can ride on the tricycle without anxiety. When the tricycle is switched over from the turning traveling state with the vehicle body frame structure $F_1$ inclined to a straight traveling state, the vehicle body frame structure $F_1$ is restored to the upright attitude, whereby the steerability can be further enhanced.

Particularly, the left and right cylindrical leg members $29_L$ and $29_R$ are pivotally supported at their upper and lower ends by the left and right upper and lower links $38_L$, $38_R$ and $39_L$, $39_R$, and the left and right front wheels $W_{FL}$ and $W_{FR}$ disposed immediately below the left and right leg members $29_L$ and $29_R$ are supported by the left and right front wheel support members $30_L$ and $30_R$ rotatably carried on the left and right leg members $29_L$ and $29_R$. Therefore, the left and right front wheels $W_{FL}$ and $W_{FR}$ do not overhang sideways of the leg members $29_L$ and $29_R$, and hence, the support rigidity of the left and right front wheels $W_{FL}$ and $W_{FR}$ is enhanced effectively in cooperation with the firm supporting of the upper and lower opposite ends of the leg members $29_L$ and $29_R$ and as a result, the stability of the banking travel can be enhanced.

In addition, since the left and right front wheels $W_{FL}$ and $W_{FR}$ do not overhang sideways of the leg members $29_L$ and $29_R$, a reduction in inertia moment of the steering system is provided, whereby the steering can be carried out lightly.

Further, the steering operatively-connecting means for operatively connecting the steering shaft 27 and the left and right front wheel support members $30_L$ and $30_R$ to each other, i.e., the pit-man arm 31, the knuckle arm 32, the tie rod 33 and the ball joint 34 are disposed below the handle post 21 and the left and right leg members $29_L$ and $29_R$. Therefore, wide spaces, which are free from the interference of the steering operatively-connecting means, can be ensured in front of and above the handle post 21 and the left and right leg members $29_L$ and $29_R$, whereby it is easy to place the carrier 36 and the like.

Moreover, the ball joint is not used in order to support the left and right front wheels $W_{FL}$ and $W_{FR}$, as described above, and hence, it is easy to ensure the support rigidity of the front wheels $W_{FL}$ and $W_{FR}$ and to provide a reduction in cost.

When the tricycle used also as the cart is used as a two-wheel cart, the relative position locking state of the saddle post 22 and the rear frame 23 by the locking means 84 may be released in the state in which the vehicle body frame structure $F_1$ is in the bicycle mode, and the grip 82 may be grasped to fold up the vehicle body frame structure $F_1$.

In this case, the resilient member 85 of the locking means 84 exhibits the spring force for biasing the saddle post 22 and the rear frame 23 in the direction to provide the cart mode, as described above and hence, when the engage member 86 has been turned by the operating portion 86b to release the maintaining of the relative positions of the saddle post 22 and the rear frame 23, the saddle post 22 and the rear frame 23 are biased in the direction to provide the cart mode by the resilient force of the resilient member 85, thereby facilitating the operation for switching over the tricycle from the bicycle mode to the cart mode.

In the sate in which the vehicle body frame $F_1$ has been folded up into the cart mode, the rear wheel $W_R$ is spaced apart from the ground surface and inserted between the left and right front wheels $W_{FL}$ and $W_{FR}$ which are in the grounded states and hence, the tricycle used also as the cart can be used as the two-wheel cart. In this case, the rear wheel $W_R$ spaced apart from the ground surface cannot be driven from the ground surface with the movement of cart, and hence, the crank pedals 65, 65 cannot be rotated. Therefore, the cart can be moved freely ion the forward and rearward directions without being obstructed by the crank pedals 65, 65.

FIGS. 11 to 15 show a second embodiment of the present invention.

Figure 11:
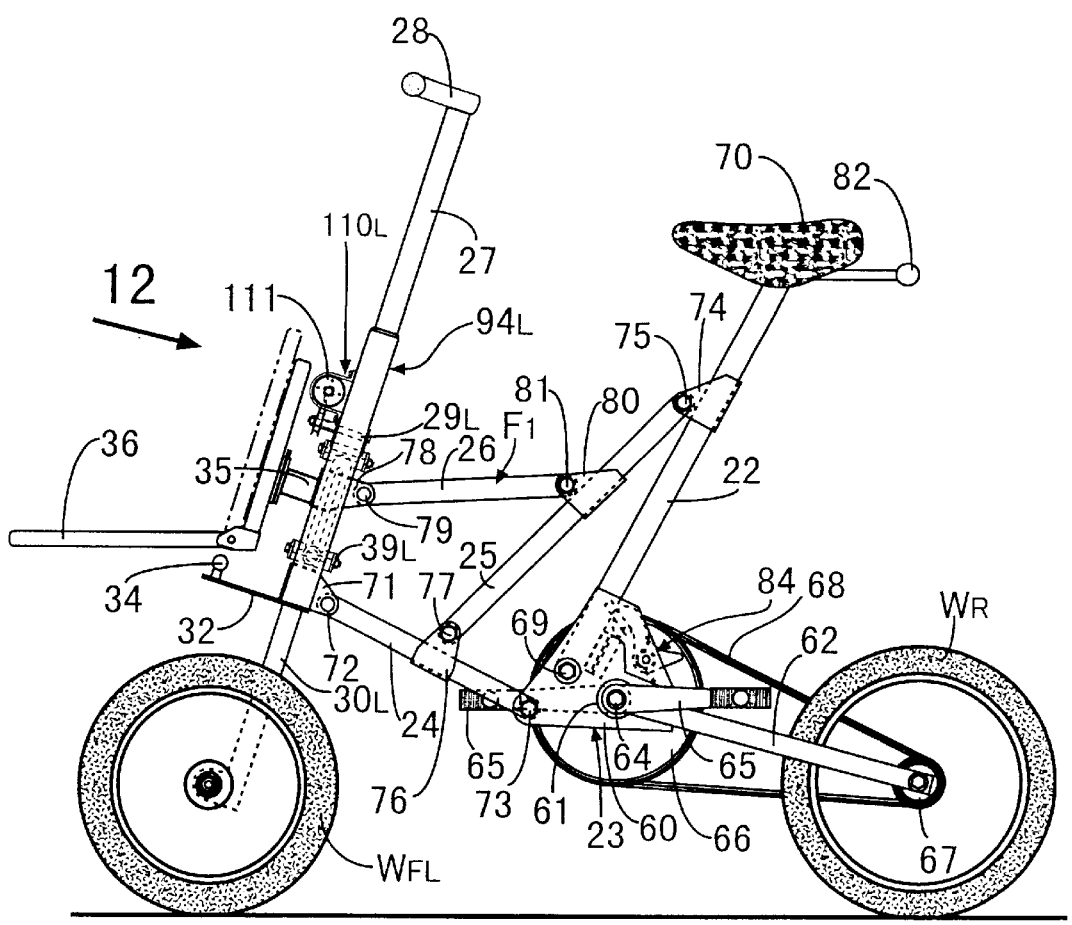
FIG. 11 is a side view of a tricycle used also as a cart, which is a bicycle mode, according to a second embodiment.
Figure 12:
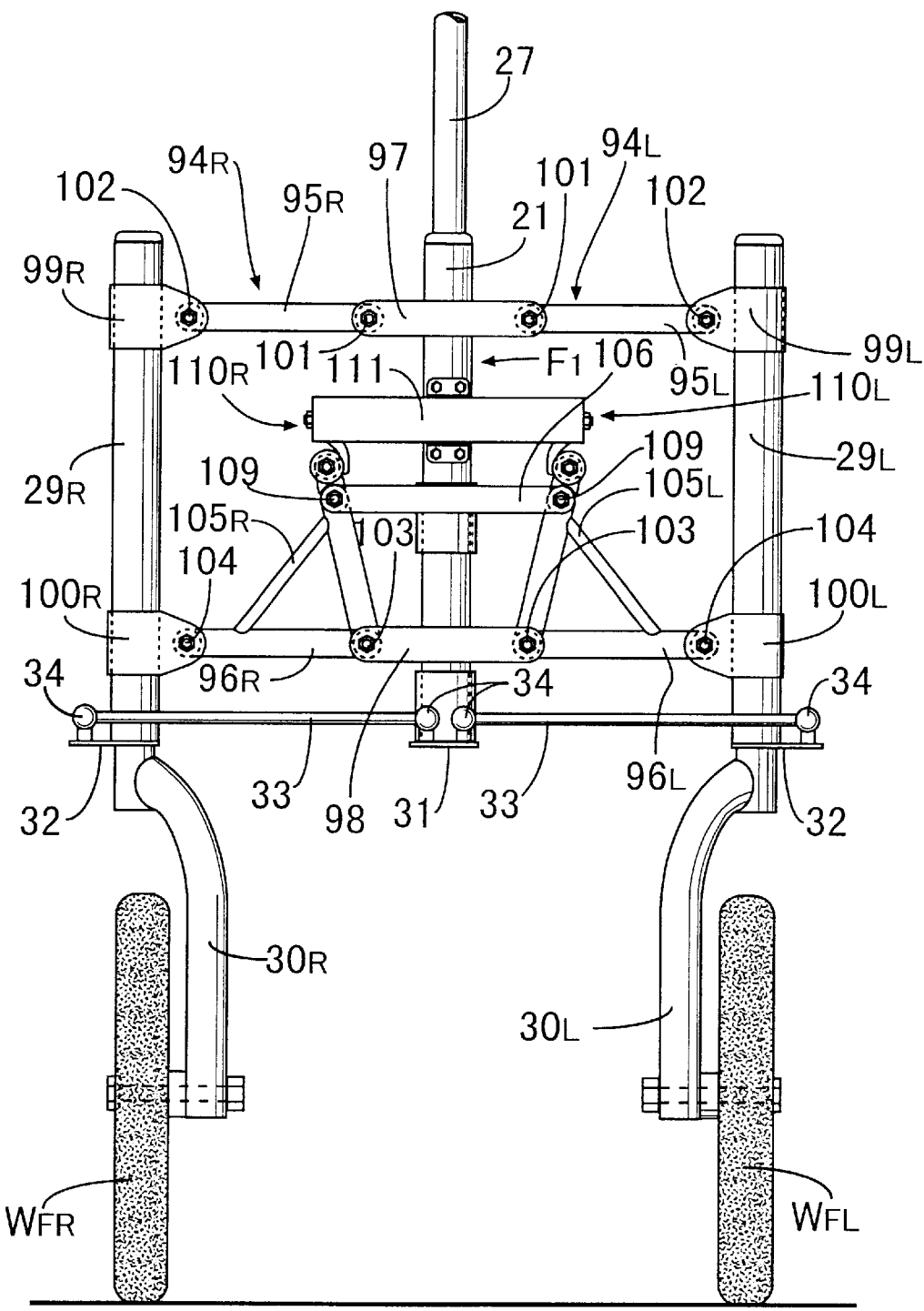
FIG. 12 is a front view taken in the direction of an arrow 12 in FIG. 11.

Referring first to FIGS. 11 and 12, a handle post 21 and a left leg member $29_L$ are connected to each other through a pipe-shaped left upper link $95_L$ and a pipe-shaped left lower link $96_L$ to form a left parallel link arrangement $94_L$, and the handle post 21 and a right leg member $29_R$ are connected to each other through a pipe-shaped right upper link $95_R$ and a pipe-shaped right lower link $96_R$ to form a right parallel link arrangement $94_R$. The left and right parallel link arrangements $94_L$ and $94_R$ are formed laterally symmetrically with respect to the handle post 21.

A pair of upper support plates 97 are secured to an upper portion of the handle post 21 and extend laterally with the handle post 21 sandwiched therebetween from the front and the rear, and a pair of lower support plates 98 are secured to a lower portion of the handle post 21 and extend laterally with the handle post 21 sandwiched therebetween from the front and the rear. Upper brackets $99_L$ and $99_R$ are secured to the left and right leg members $29_L$ and $29_R$ in correspondence to the upper support plates 97, and lower brackets $100_L$ and $100_R$ are also secured to the left and right leg members $29_L$ and $29_R$ in correspondence to the lower support plates 98.

The left and right upper links $95_L$ and $95_R$ are turnably connected at their inner ends to opposite ends of the upper support plates 97 through connecting pins 101, 101 having axes extending on the longitudinal direction of the vehicle body frame structure $F_1$, respectively, and at their outer ends to the upper brackets $99_L$ and $99_R$ through connecting pins 102, 102 having axes parallel to the connecting pins 101, respectively.

The left and right lower links $96_L$ and $96_R$ are turnably connected at their inner ends to opposite ends of the lower support plates 98 through connecting pins 103, 103 having axes parallel to the connecting pins 101, 102, respectively, and at their outer ends to the lower brackets $100_L$ and $100_R$ through connecting pins 104, 104 having axes parallel to the connecting pins 103, respectively.

In such parallel link arrangements $94_L$ and $94_R$, the left and right upper links $95_L$ and $95_R$ are independent from each other, and the left and right lower links $96_L$ and $96_R$ are independent from each other. Therefore, in this structure as it is, the parallel link arrangements $94_L$ and $94_R$ permit the upward and downward movement of the handle post 21 relative to the leg members $29_L$ and $29_R$.

Therefore, the left and right lower links $96_L$ and $96_R$ are provided with connecting frames $105_L$ and $105_R$, respectively, and the connecting members 106, 106 are turnably connected at their opposite ends to the connecting frames $105_L$ and $105_R$, respectively.

Figure 13:
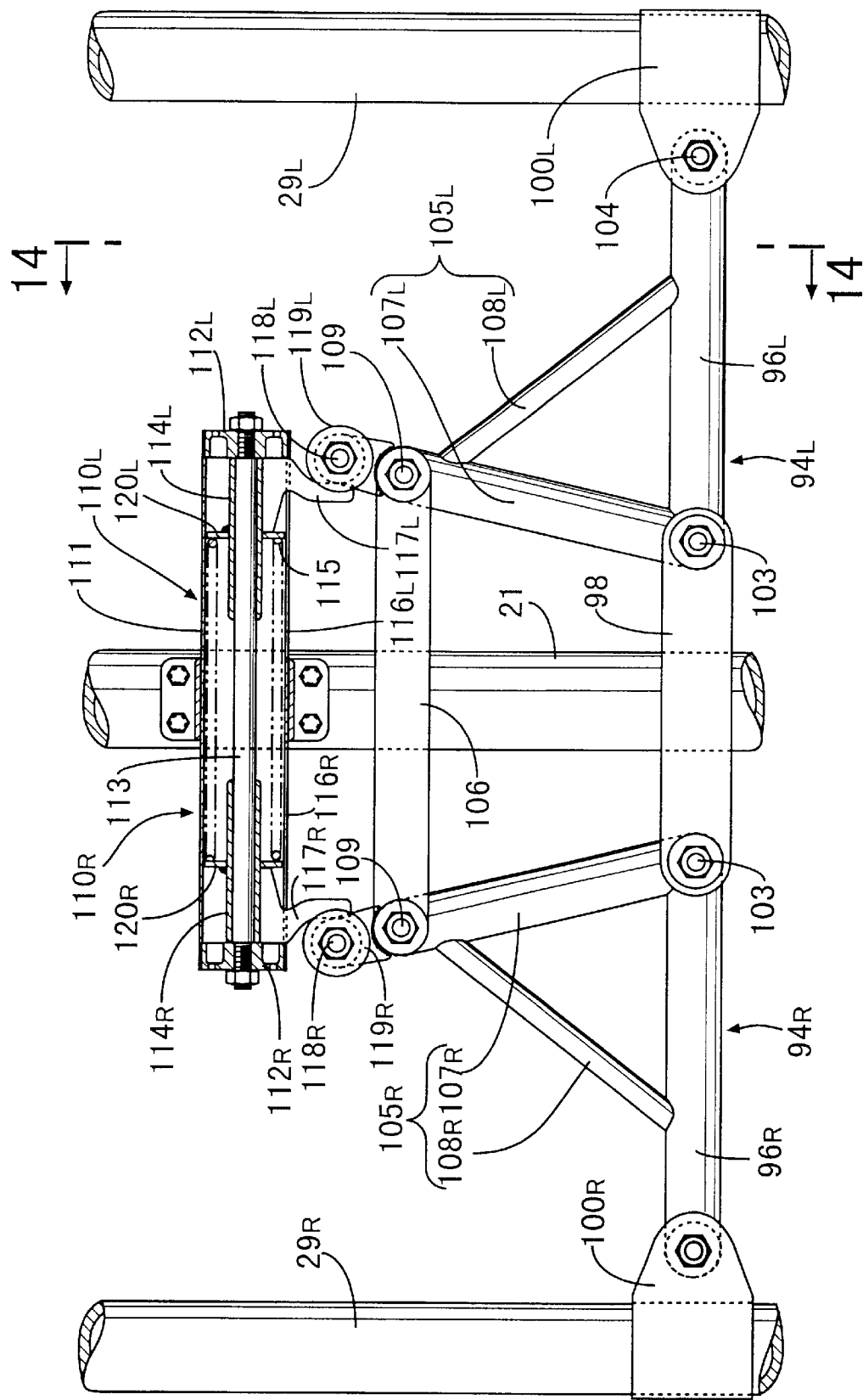
FIG. 13 is an enlarged view of an essential portion shown in FIG. 12.
Figure 14:
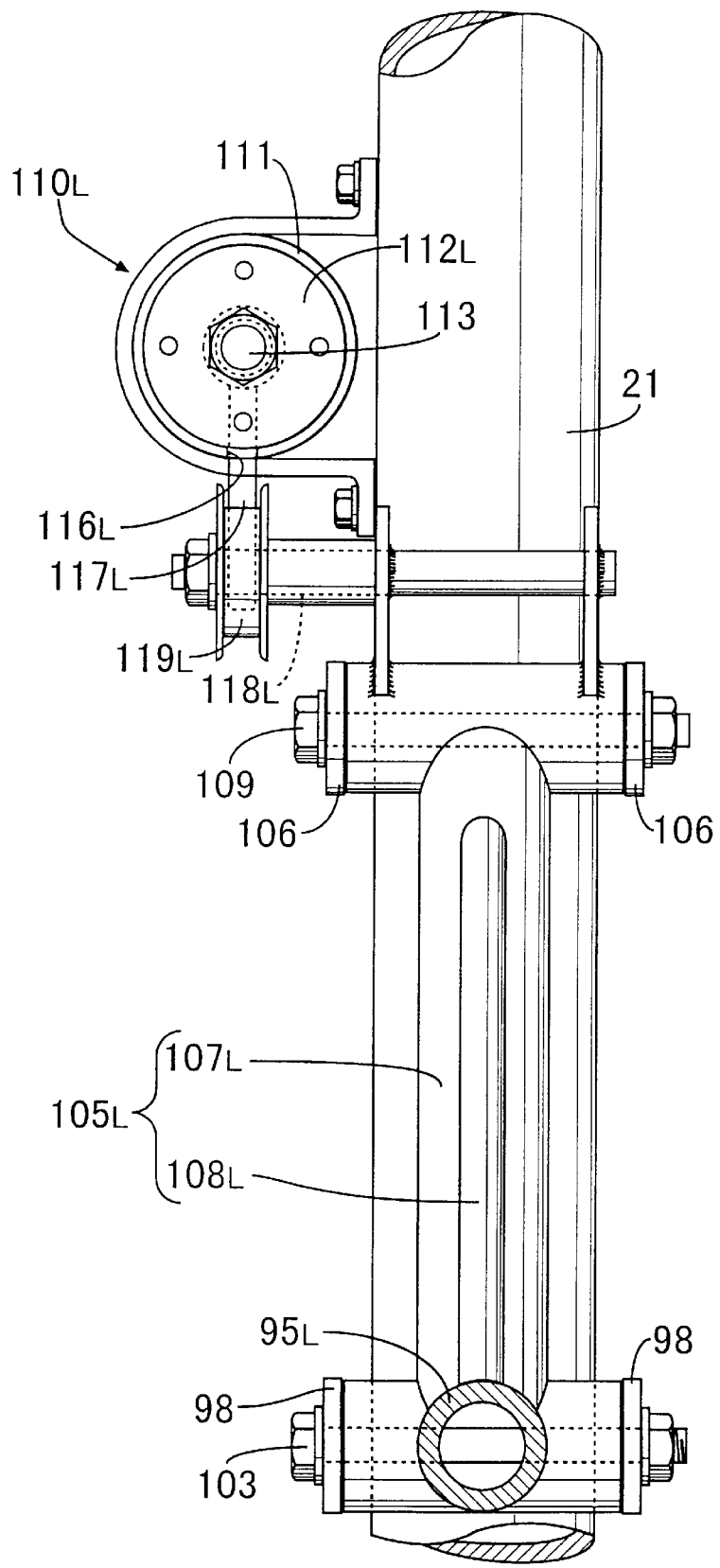
FIG. 14 is an enlarged sectional view taken along a line 14—14 in FIG. 13.

Referring also to FIGS. 13 and 14, the connecting frame $105_L$ provided on the left lower link $96_L$ is formed into a substantially triangular shape by a rising pipe $107_L$ integrally connected to the inner end of the left lower link $96_L$ and extending upwards, and a connecting pipe $108_L$ connecting an intermediate portion of the left lower link $96_L$ and an upper portion of the rising pipe $107_L$ to each other. The connecting frame $105_R$ provided on the right lower link $96_R$ is formed into a substantially triangular shape by a rising pipe $107_R$ integrally connected to the inner end of the right lower link $96_R$ and extending upwards, and a connecting pipe $108_R$ connecting an intermediate portion of the right lower link $96_R$ and an upper portion of the rising pipe $107_R$ to each other.

The connecting members 106, 106 are each formed of a band-shaped flat plate, and are disposed at a location where they sandwich the handle post 21 from the front and the rear. The connecting members 106, 106 are turnably connected at their opposite ends to upper portions of the rising pipes $107_L$ and $107_R$ of the connecting frames $105_L$ and $105_R$ through connecting shafts 109, 109, respectively.

Such a simple structure in which the connecting members 106, 106 are merely turnably connected at their opposite ends to the connecting frame $105_L$ provided on the left lower link $96_L$ and to the connecting frame $105_R$ provided on the right lower link $96_R$, ensures that the handle post 21 cannot be permitted by the parallel link arrangements $94_L$ and $94_R$ to be moved upwards and downwards relative to the leg members $29_L$ and $29_R$, and can withstand a load applied thereto, whereby the function of the left and right parallel link arrangements $94_L$ and $94_R$ can be maintained.

Figure 15:
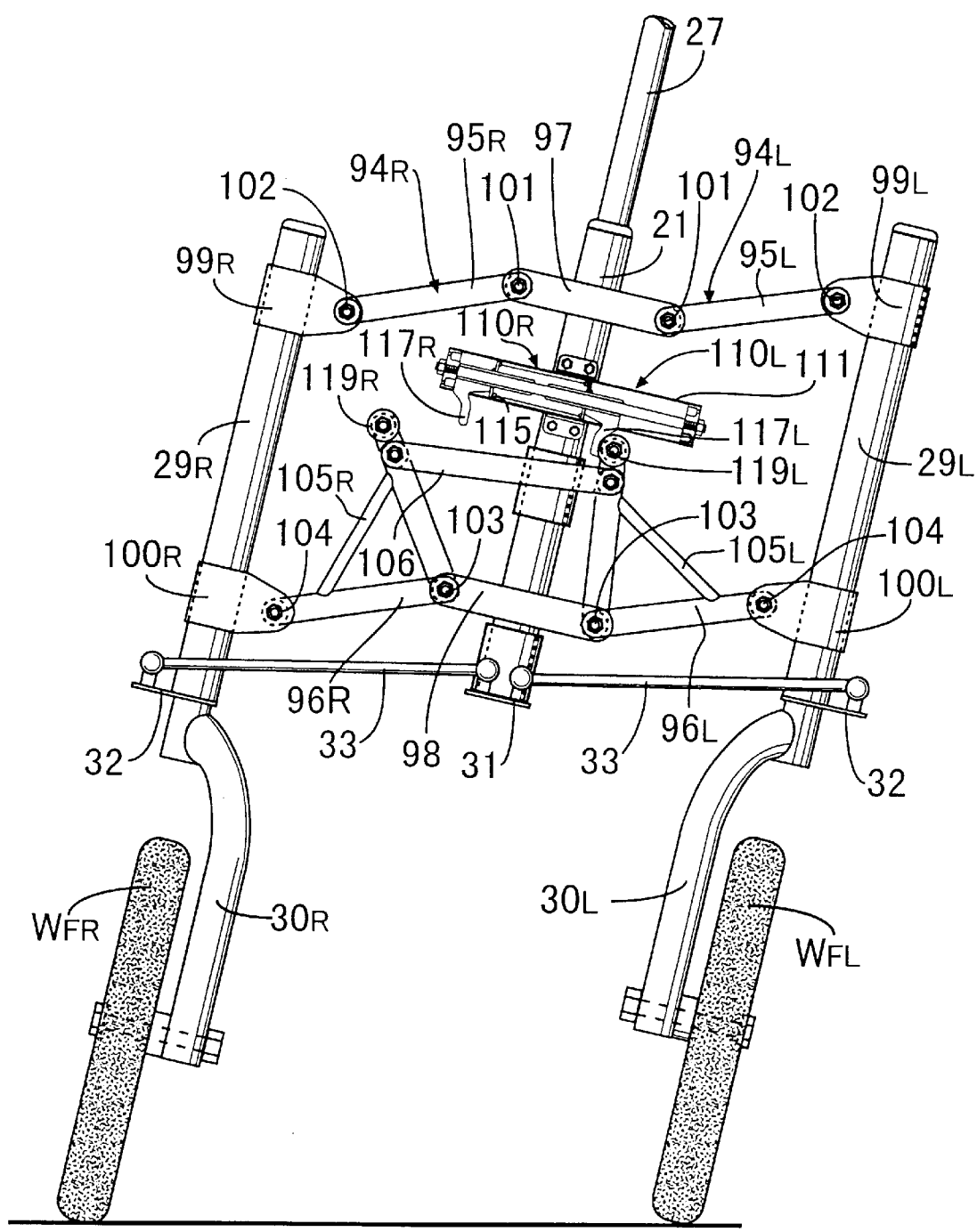
FIG. 15 is a front view similar to FIG. 12, but with the vehicle body frame structure inclined leftwards.

More specifically, as shown in FIG. 15, the leg members $29_L$ and $29_R$ are inclined leftwards or rightwards with the leftward or rightward inclination of the handle post 21, whereby the vehicle body frame structure $F_1$ can be inclined either leftwards or rightwards to enable a banking travel of the tricycle, leading to an enhanced steering travelability.

In the left parallel link arrangement $94_L$, a left upright attitude maintaining means $110_L$ is provided between the handle post 21 and one of the left upper and lower links $95_L$ and $96_L$, e.g., the left lower link $96_L$. In the right parallel link arrangement $94_R$, a right upright attitude maintaining means $110_R$ is provided between the handle post 21 and one of the right upper and lower links $95_R$ and $96_R$, e.g., the right lower link $96_R$.

The left upright attitude maintaining means $110_L$ includes a guide tube 111 which is secured to the handle post 21 and has an axis extending in a lateral direction and which is closed at its opposite ends by end wall members $112_L$ and $112_R$, respectively, a guide rod 113 which is secured at their opposite ends to the end wall members $112_L$ and $112_R$ and concentrically disposed within the guide tube 111, a movable tube $114_L$ which is accommodated within the guide tube 111 for sliding movement along the guide rod 113, a spring 115 for exhibiting a spring force in a direction to move the movable tube $114_L$ toward the end wall member $112_L$, an abutment arm $117_L$ provided on the movable tube $114_L$ to protrude downwards from a slit $116_L$ provided in a left lower sidewall of the guide tube 111, and a roller $119_L$ which is rotatably carried at an upper end of the connecting frame $105_L$ through a support shaft $118_L$ having an axis parallel to the connecting pins 101 to 104 and which is capable of being put into abutment against the abutment arm $117_L$ from the outside in an axial direction of the guide tube 111.

The right upright attitude maintaining means $110_R$ includes the guide tube 111, the guide rod 113 and the spring 115 commonly included in the left upright attitude maintaining means $110_L$, and further includes a movable tube $114_R$ accommodated within the guide tube 111 for sliding movement along the guide rod 113, an abutment arm $117_R$ provided on the movable tube $114_R$ to protrude downwards from a slit $116_R$ provided in a right lower sidewall of the guide tube 111, and a roller $119_R$ which is rotatably carried at an upper end of the connecting frame $105_R$ through a support shaft $118_R$ having an axis parallel to the support shaft $118_L$ and which is capable of being put into abutment against the abutment arm $117_R$ from the outside in the axial direction of the guide tube 111.

Collars $120_L$ and $120_R$ are secured to the movable tubes $114_L$ and $114_R$ with their outer peripheries in sliding contact with an inner surface of the guide tube 111, and the spring 115, which is a coil spring, is mounted under compression between both the collars $120_L$ and $120_R$ to surround the guide rod 113.

When the vehicle body frame structure $F_1$ has been inclined leftwards, as shown in FIG. 15, the abutment arm $117_L$ and the movable tube $114_L$ in the left upright attitude maintaining means $110_L$ are pushed rightwards by the roller $119_L$, while compressing the spring 115. During this time, in the right upright attitude maintaining means $110_R$, the movable tube $114_R$ is in abutment against the end wall member $112_L$, and the roller $119_R$ is spaced apart from the abutment arm $117_R$. Therefore, the spring force for returning the handle post 21 to the upright attitude is applied from the left upright attitude maintaining means $110_L$ to the handle post 21 through the guide tube 111, and the right upright attitude maintaining means $110_R$ cannot exert the spring force to the handle post 21. On the other hand, when the handle post 21 has been inclined rightwards from the upright attitude, the spring force for returning the handle post 21 to the upright attitude is applied from the right upright attitude maintaining means $110_R$ to the handle post 21 through the guide tube 111, and the left upright attitude maintaining means $110_L$ cannot exert the spring force to the handle post 21.

Even in the second embodiment, an effect similar to that in the first embodiment can be provided.

Figure 16:
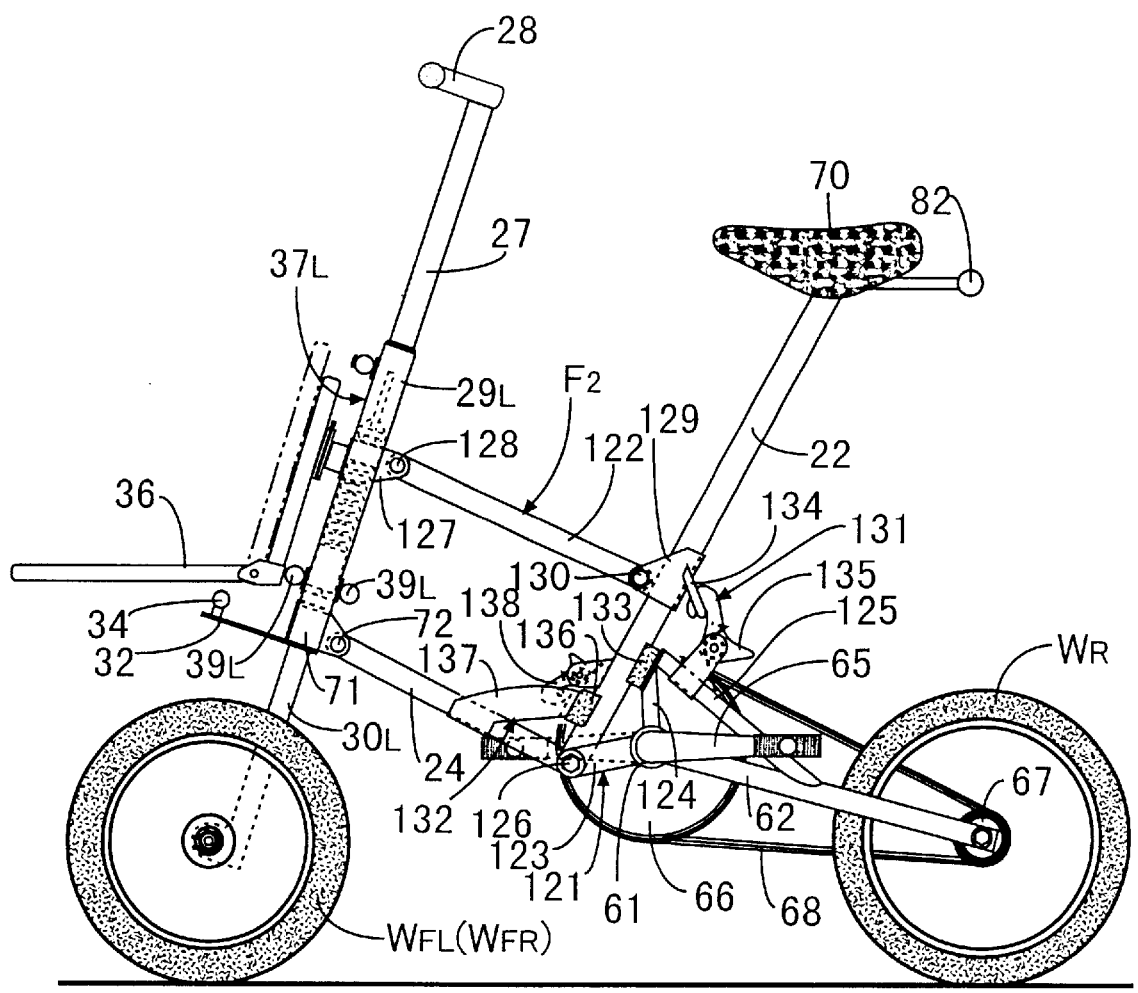
FIG. 16 is a side view of a tricycle used also as a cart, which is in a bicycle mode, according to a third embodiment.
Figure 17:
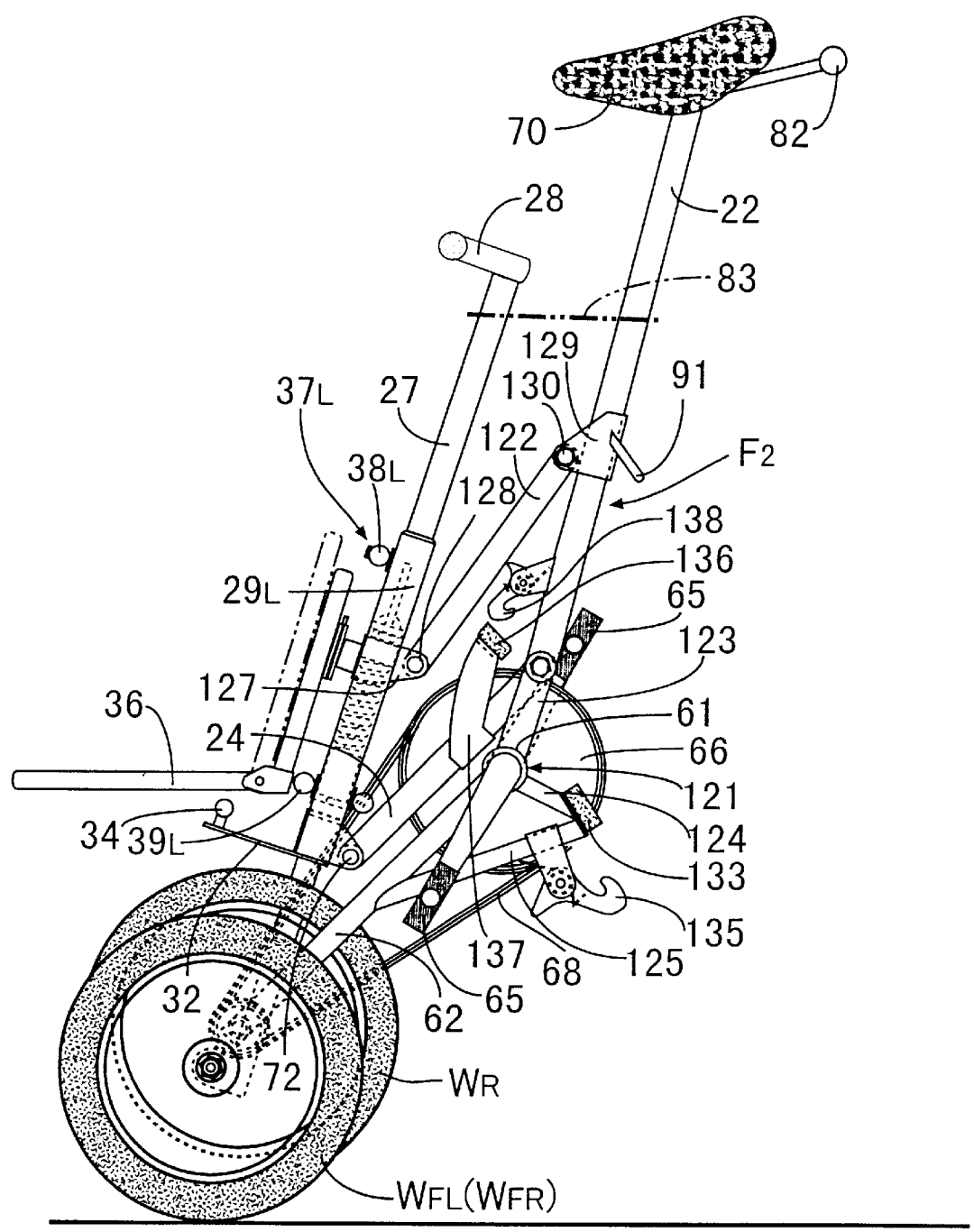
FIG. 17 is a side view of the tricycle used also as a cart, which is in a cart mode.

FIGS. 16 and 17 show a third embodiment of the present invention.

A vehicle body frame structure $F_2$ in a tricycle used also as a cart is comprised of a handle post 21 (see the first and second embodiments; and which is not shown in FIGS. 16 and 17), a saddle post 22, a rear frame 121, a bottom pipe 24 and a link pipe 122. The vehicle body frame structure $F_2$ is capable of being switched over between a bicycle mode in which it has been deployed, as shown in FIG. 16, and a cart mode in which it has been folded up, as shown in FIG. 17.

The rear frame 121 is comprised of the following members connected integrally with one another: a tube 61 which rotatably supports crank pedals 65, 65, a first pipe frame 123 extending in a forward lower inclined manner from the tube 61 in the bicycle mode, a second pipe frame 124 extending in a forward upper inclined manner from the tube 61 in the bicycle mode, a rear fork 62 which extends in a rearward lower inclined manner from the tube 61 in the bicycle mode and on a rear end of which a rear wheel $W_R$ is supported by a shaft, and a reinforcing pipe 125 which connects an upper end of the second pipe frame 124 and an intermediate portion of the rear fork 62 to each other.

The bottom pipe 24 is turnably connected at its one end to a bracket 71 mounted at a lower portion of the handle post 21 through a pivot 72 having an axis parallel to a rotational axis of the rear wheel $W_R$, and a lower end of the saddle post 22, the other end of the bottom pipe 24 and a tip end of the first pipe frame 124 in the rear frame 121 are connected together through a pivot 126 parallel to the pivot 72.

The link pipe 122 connects an intermediate portion in the upward and downward direction of the handle post 21 and a lengthwise intermediate portion of the saddle post 22 to each other. The link pipe 122 is connected at its one end to a bracket 127 secured to the intermediate portion in the upward and downward direction of the handle post 21 through a pivot 128 having an axis parallel to the pivots 73 and 126, and at the other end to a bracket 129 secured to the lengthwise intermediate portion of the saddle post 22 through a pivot 130 having an axis parallel to the pivot 128.

The handle post 21, the saddle post 22, the rear frame 121, the bottom pipe 24 and the link pipe 122, which are turnably connected to one another through the pivots 72, 126, 128 and 130 to form the vehicle body frame structure $F_2$, comprise a link mechanism which is capable of switching over, from one to another, the bicycle mode in which the vehicle frame body structure $F_2$ has been deployed, so that both of left and right front wheels $W_{FL}$ and $W_{FR}$ and the rear wheel $W_R$ have been grounded to provide the maximum wheel base, as shown in FIG. 16, and the cart mode in which the vehicle frame body structure $F_2$ has been folded up, so that the rear wheel $W_R$ spaced apart from the ground surface has been inserted between the left and right front wheels $W_{FL}$ and $W_{FR}$ which are in their grounded states, as shown in FIG. 17.

When the vehicle frame body structure $F_2$ is in the bicycle mode, the bicycle mode of the vehicle frame body structure $F_2$ can be maintained by locking means 131 and 132.

The locking means 131 is provided between the saddle post 22 and the rear frame 121 among the handle post 21, the saddle post 22, the rear frame 121, the bottom pipe 24 and the link pipe 122 which form the vehicle body frame structure $F_2$.

The locking means 131 includes a resilient member 133 which is made of an elastic material, e.g., a rubber and which is fixed to the rear frame 121 in such a manner that it is sandwiched between the saddle post 22 and the rear frame 121, when the vehicle body frame structure $F_2$ is in the bicycle mode, and an engage member 135 which is mounted to the rear frame 121 to maintain the relative positions of the saddle post 22 and the rear frame 121 so as to releasably engage a locking member 134 mounted on the saddle post 22.

The resilient member 133 is secured to upper ends of the second pipe frame portion 124 and the reinforcing pipe 125 in the rear frame 121, and is sandwiched between the saddle post 22 and the rear frame 121 to exhibit a resilient force opposing a riding load applied from the saddle post 22, when the vehicle body frame structure $F_2$ is in the bicycle mode.

The locking means 132 is provided between the bottom pipe 24 and the saddle post 22 among the handle post 21, the saddle post 22, the rear frame 121, the bottom pipe 24 and the link pipe 122 which form the vehicle body frame structure $F_2$.

The locking means 132 includes a resilient member 136 which is made of an elastic material, e.g., a rubber and which is fixed to the bottom pipe 24 in such a manner that it is sandwiched between the bottom frame 24 and the saddle post 22, when the vehicle body frame structure $F_2$ is in the bicycle mode, and an engage member 138 which is mounted to the saddle post 22 to maintain the relative positions of the saddle post 22 and the bottom pipe 24 so as to releasably engage the bottom pipe 24. A support arm 137 is integrally connected to the bottom pipe 24 in such a manner that a tip end thereof is opposed to a front surface of the saddle post 22 in the bicycle mode, and the resilient member 136 is fixed to the tip end of the support arm 137 in such a manner that it engages the front surface of the saddle post 22. Thus, when the vehicle body frame structure $F_2$ is in the bicycle mode, the resilient member 136 is sandwiched between the support arm 137 and the saddle post 22 to exhibit the resilient force opposing the riding load.

The engage member 138 is mounted to the saddle post 22, so that it engages the tip end of the support arm 137, when the vehicle body frame structure $F_2$ is in the bicycle mode.

In the first and second embodiments, the handle post 21, the saddle post 22, the rear frame 23, the bottom pipe 24, the first link pipe 25 and the second link pipe 26 are turnably connected together through the seven pivots 69, 72, 73, 75, 77, 79 and 81 to form the vehicle body frame structure $F_1$, and on the other hand, in the third embodiment, the handle post 21, the saddle post 22, the rear frame 121, the bottom pipe 24 and the link pipe 122 are turnably connected together through the four pivots 72, 126, 128 and 130 to form the vehicle body frame structure $F_2$, whereby the arrangement of the vehicle body frame structure $F_2$ can be simplified.

Figure 18:
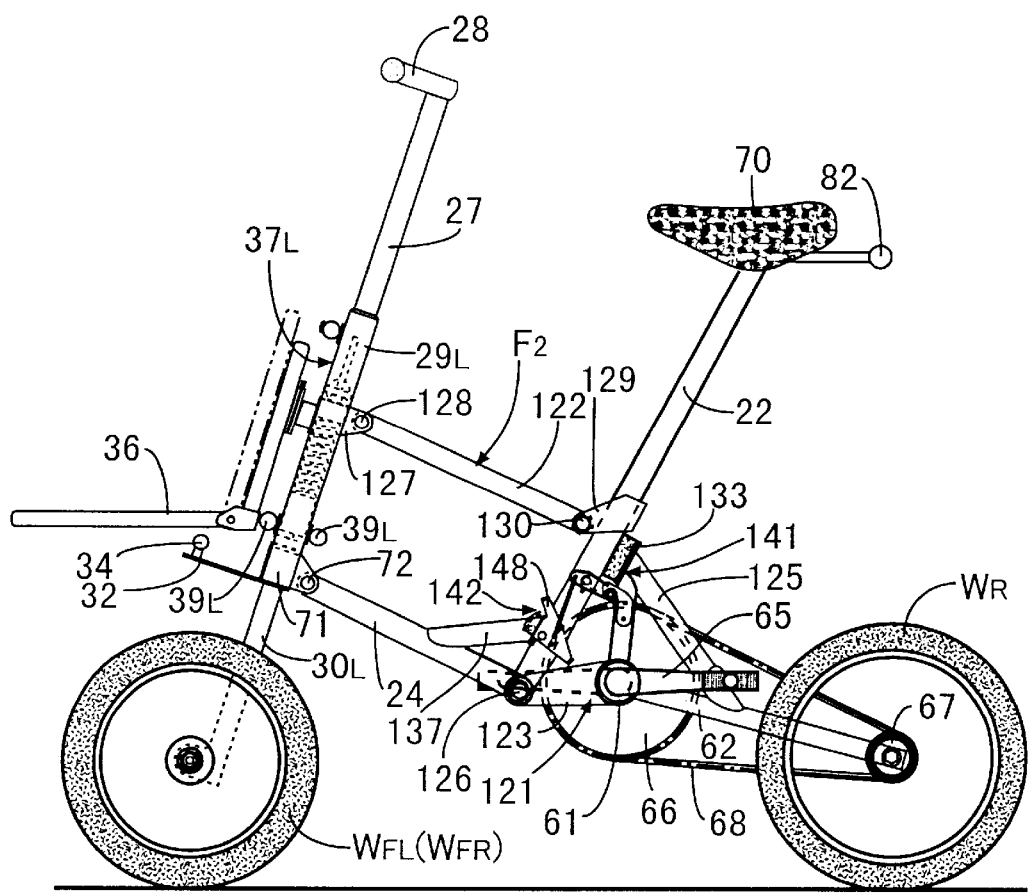
FIG. 18 is a side view of a tricycle used also as a cart, which is in a bicycle mode, according to a fourth embodiment.
Figure 19:
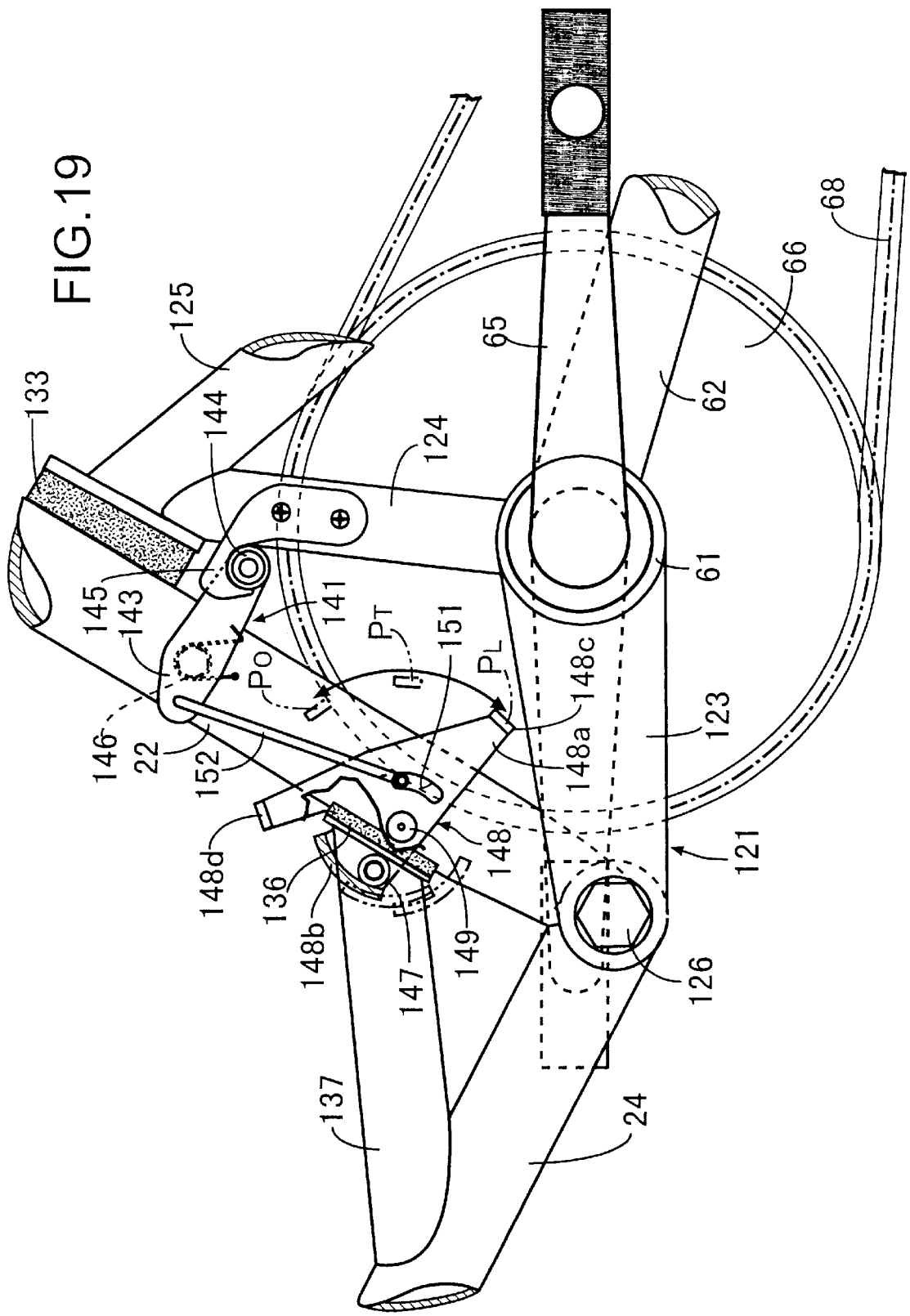
FIG. 19 is an enlarged view of an essential portion shown in FIG. 18.
Figure 20:
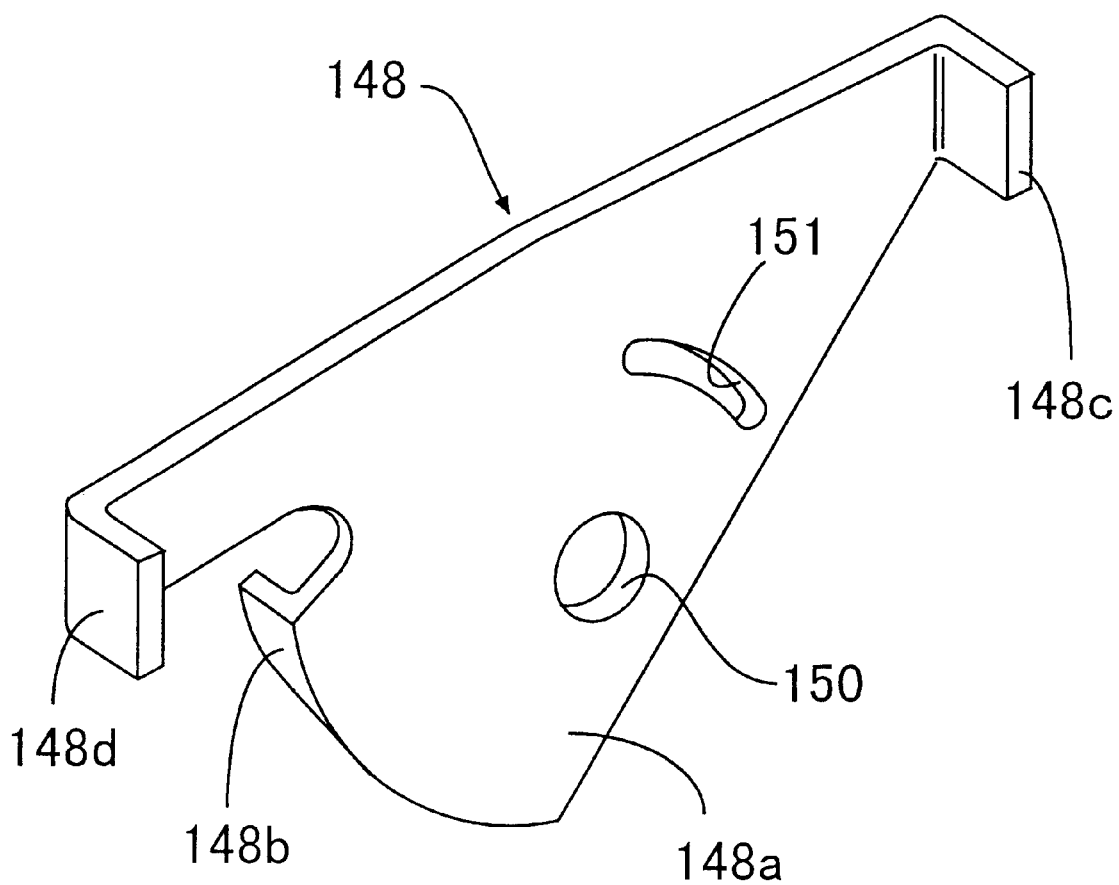
FIG. 20 is an enlarged perspective view of an operating lever.

FIGS. 18 to 20 show a fourth embodiment of the present invention.

The attitude of a vehicle body frame structure $F_2$ when in a bicycle mode is maintained by first and second locking means 141 and 142. The first locking means 141 is provided between a saddle post 22 and a rear frame 121 of the components of a vehicle body frame structure $F_2$, and the second locking means 142 is provided between a bottom pipe 24 and the saddle post 22.

The first locking means 141 includes a resilient member 133 which is made of an elastic material, e.g., a rubber and which is fixed to the rear frame 121 in such a manner that it is sandwiched between the saddle post 22 and the rear frame 121, when the vehicle body frame structure $F_2$ is in the bicycle mode, a lever 143 turnably mounted to the saddle post 22, a hook 145 which is secured to the rear frame 121 to maintain the relative positions of the saddle post 22 and the rear frame 121 so as to releasably engage a locking pin 144 mounted at one end of the lever 143, and a torsion spring 146 mounted between the lever 143 and the saddle post 22 to exhibit a spring force for biasing the lever 143 in a direction to bring the locking pin 144 of the lever 143 into engagement with the hook 145.

The resilient member 133 is secured to the upper ends of the second pipe frame 124 and the reinforcing pipe 125 in the rear frame 121, and is sandwiched between the saddle post 22 and the rear frame 121 to exhibit a resilient force opposing a riding load applied from the saddle post 22 when the vehicle body frame structure $F_2$ is in the bicycle mode.

The second locking means 142 includes a resilient member 136 fixed to a tip end of a support arm 137 integrally connected to the bottom pipe 24, and an operating lever 148 turnably mounted to the saddle post 22, so that it can be brought into engagement with a locking pin 147 fixedly mounted on the support arm 137. When the vehicle body frame structure $F_2$ is in the bicycle mode, the resilient member 136 is sandwiched between the bottom frame 24 and the saddle post 22 by bringing the operating lever 148 into engagement with the locking pin 147, whereby the relative positions of the saddle post 22 and the bottom pipe 24 are maintained.

The operating lever 148 is integrally provided with the following portions as shown in FIG. 20: a flat plate portion 148a having a support bore 150 which is provided therein and through which a support shaft 149 for turnably mounting the operating lever 148 to the saddle post 22 is inserted, an engage portion 148b which protrudes from an outer edge of the flat plate portion 148a toward the support arm 137, so that it can be brought into engagement with the locking pin 147, a first operating portion 148c which protrudes from the outer edge of the flat plate portion 148a in a direction opposite from the engage portion 148b to turn the operating lever 148 in a clockwise direction as viewed in FIG. 19 by applying a force from the above to bring the engage portion 148b into engagement with the locking pin 147, and a second operating portion 148d which protrudes from the outer edge of the flat plate portion 148a in the direction opposite from the engage portion 148b to turn the operating lever 148 in a counterclockwise direction as viewed in FIG. 19 by applying a force from the above to release the engagement of the engage portion 148b with the locking pin 147.

The operating lever 148 can be turned in the clockwise direction as viewed in FIG. 19 from an opened position $P_O$ via a tight position $P_T$ to a locked position $P_L$. The engage portion 148b is formed into an arcuate shape such that the distance from an axis of the support shaft 149 is gradually decreased as the operating lever 148 is turned in the counterclockwise direction as viewed in FIG. 19, so that the engagement of the engage portion 148b with the locking pin 147 is started in response to the turning movement of the operating lever 148 from the opened position $P_O$ to the tight position $P_T$, and the locking pin 147 is pulled nearer to gradually compress the resilient member 136, as the operating lever 148 is turned about the support shaft 149 in the clockwise direction as viewed in FIG. 19 from the tight position $P_T$ to the locked position $P_L$.

When an operating force has been applied to the first operating portion 148c to turn the operating lever 148 to the locked position $P_L$, the locking pin 147 and the engage portion 148b are brought into friction engagement with each other by the large resilient force exhibited by the resilient member 136 and thus, the operating lever 148 is stopped at the locked position $P_L$, unless the operating force is applied to the operating lever 148.

An elongated bore 151 having an arcuate shape about the axis of the support shaft 149 is provided in the flat plate portion 148a of the operating lever 148. On the other hand, a connecting rod 152 is turnably connected at its upper end to the other end of the lever 143 in the first lock means 141 and extends downwards, with a lower end of the connecting rod 152 being engaged in the elongated bore 151. The length of the connecting rod 152 is set, so that when the operating lever 148 of the second lock means 142 is in the locked position $P_L$ when the first lock means 141 is in the locked state, a lower end of the connecting rod 152 is in a position corresponding to an upper end of the elongated bore 151, so that the unlocking of the first lock means 141 is impossible, and when the operating lever 148 of the second lock means 142 is in the tight position $P_T$ with the first lock means 141 being in the locked state, the lower end of the connecting rod 152 is in a position corresponding to a lower end of the elongated bore 151, so that the unlocking of the first lock means 141 is possible, and further, when the operating lever 148 of the second lock means 142 has been turned to the opened position $P_O$, the lever 143 is pushed upwards against the spring force of the torsion spring 146 to forcibly unlock the first lock means 141.

According to the fourth embodiment, the first lock means 141 provided between the saddle post 22 and the rear frame 121 of the components of the vehicle body frame structure $F_2$ and the second lock means 142 provided between the bottom pipe 24 and the saddle post 22 are operatively connected to each other, so that the locked state of the first lock means 141 can be maintained in response to the locking operation of the second lock means 142, and the first lock means 141 can be unlocked in response to the unlocking operation of the second lock means 142.

Therefore, it is necessary to maintain the relative positions of the saddle post 22 and the rear frame 121 as well as between the bottom pipe 24 and the saddle post 22 in the bicycle mode, due to the vehicle body frame structure $F_2$ being of a simple arrangement comprising the handle post 21, the saddle post 22, the rear frame 121, the bottom pipe 24 and the link pipe 122 which are turnably connected together through four pivots 72, 126, 128 and 130, as described above. However, in response to the locking operation of the second lock means 142 of the first and second lock means 141 and 142, the first lock means 141 is also maintained in the locked state, and in response to the unlocking operation of the second lock means 142, the first lock means 141 is unlocked, whereby the locking operation and the unlocking operation can be facilitated extremely.

Although the embodiments of the present invention have been described in detail, it will be understood that the present invention is not limited to the above-described embodiments, and various modifications in design may be made without departing from the spirit and scope of the invention defined in claims.

For example, the present invention has been described as applied to the tricycle used also as the cart in each of the embodiments, but the present invention is applicable to a tricycle which is not used as a cart. The present invention is also applicable not only to a tricycle driven by a human power, but also to a tricycle including a power source, or a tricycle including a power source assisted by a human power.

What is claimed is:

1. A tricycle including a pair of left and right front steerable wheels ($W_{FL}$, $W_{FR}$) supported at a front portion of a vehicle body frame structure ($F_1$), and a single rear drivable wheel ($W_R$) supported at a rear portion of the vehicle body frame structure ($F_1$), wherein said tricycle comprises a cylindrical handle post (21) which is fixedly mounted at a front end of said vehicle body frame structure ($F_1$) and which turnably supports a steering shaft (27) connected to a steering handlebar (28), left and right upper links ($38_L$, $38_R$) which are integrally connected to each other and pivotally supported at an upper end of said handle post (21), left and right lower links ($39_L$, $39_R$) which are integrally connected to each other and pivotally supported at a lower end of said handle post (21), a cylindrical left leg member ($29_L$) which is pivotally supported at upper and lower opposite ends thereof to outer ends of said left upper and lower links ($38_L$, $39_L$), a cylindrical right leg member ($29_R$) which is pivotally supported at upper and lower opposite ends thereof to outer ends of said right upper and lower links ($38_R$, $39_R$), a left front wheel support member ($30_L$) rotatably supported on said left leg member ($29_L$), a right front wheel support member ($30_R$) rotatably supported on said right leg member ($29_R$), said left front wheel ($W_{FL}$) being supported on said left front wheel support member ($30_L$) and disposed immediately below said left leg member ($29_L$), said right front wheel ($W_{FR}$) being supported on said right front wheel support member ($30_R$) and disposed immediately below said right leg member ($29_R$), and a steering operatively-connecting means (31 to 34) being disposed below said handle post (21) and both said leg members ($29_L$, $29_R$) for operatively connecting said steering shaft (27) and said left and right front wheel support members ($30_L$, $30_R$) to each other.

2. A tricycle including a pair of left and right front steerable wheels ($W_{FL}$, $W_{FR}$) supported at a front portion of a vehicle body frame structure ($F_2$), and a single rear drivable wheel ($W_R$) supported at a rear portion of the vehicle body frame structure ($F_2$), wherein said tricycle comprises a cylindrical handle post (21) which is fixedly mounted at a front end of said vehicle body frame structure ($F_2$) and which turnably supports a steering shaft (27) connected to a steering handlebar (28) left and right upper links ($95_L$, $95_R$) which are independent from each other and pivotally supported at an upper end of said handle post (21), left and right lower links ($96_L$, $96_R$) which are independent from each other and pivotally supported at a lower end of said handle post (21), a cylindrical left leg member ($29_L$) which is pivotally supported at upper and lower opposite ends thereof to outer ends of said left upper and lower links ($95_L$, $96_L$), a cylindrical right leg member ($29_R$) which is pivotally supported at upper and lower opposite ends thereof to outer ends of said right upper and lower links ($95_R$, $96_R$), a left front wheel support member ($30_L$) turnably supported on said left leg member ($29_L$), a right front wheel support member ($30_R$) turnably supported on said right leg member ($29_R$), left and right connecting frames ($105_L$, $105_R$) which are fixedly mounted on at least ones of: said left and right upper links ($95_L$, $95_R$); and said left and right lower links ($96_L$, $96_R$), respectively, a connecting member (106) which is turnably connected at opposite ends thereof to said connecting frames ($105_L$, $105_R$), said left front wheel ($W_{FL}$) being supported on said left front wheel support member ($30_L$) and disposed immediately below said left leg member ($29_L$), said right front wheel ($W_{FR}$) being supported on said right front wheel support member ($30_R$) and disposed immediately below said right leg member ($29_R$), and a steering operatively-connecting means (30 to 34) being disposed below said handle post (21) and both said leg members ($29_L$, $29_R$) for operatively connecting said steering shaft (27) and said left and right front wheel support members ($30_L$, $30_R$) to each other.

3. A tricycle according to claim 1 or 2, further including a left upright attitude maintaining means ($44_L$, $110_L$) which is provided between said handle post (21) and one of said left upper and lower links ($38_L$, $39_L$, $95_L$, $96_L$,) for exhibiting a spring force for returning said handle post (21) to upright attitude thereof in response to said handle post (21) inclining leftwards from the upright attitude, but for avoiding exhibiting a spring force, when said handle post (21) is inclined rightwards from the upright attitude, and a right upright attitude maintaining means ($44_R$, $110_R$,) which is provided between said handle post (21) and one of the right upper and lower links ($38_R$, $39_R$, $95_R$, $96_R$,) for exhibiting a spring force for returning said handle post (21) top upright attitude thereof in response to said handle post (21) inclining rightwards from the upright attitude, but for avoiding exhibiting a spring force, when said handle post (21) is inclined leftwards from the upright attitude, and a spring force for biasing said handle post (21) in the direction toward the upright attitude being applied to said left and right upright attitude maintaining means (44$_L$, 110$_L$, 44$_R$, 110$_R$,) even in the upright state of said handle post (21), wherein said left and right upright attitude maintaining means maintain said tricycle in an upright manner.

\* \* \* \* \*